(12) United States Patent
Kobayashi et al.

(10) Patent No.: US 7,000,726 B2
(45) Date of Patent: Feb. 21, 2006

(54) ENGINE POSITIONING STRUCTURE FOR AN AUTOMOBILE

(75) Inventors: Taichi Kobayashi, Hiroshima (JP); Yasuhiro Kouhara, Hiroshima (JP); Osamu Kishi, Hiroshima (JP); Yukio Nakamura, Hiroshima (JP); Isao Tohda, Hiroshima (JP); Katsumasa Sogame, Hiroshima (JP); Masayoshi Sannomiya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 82 days.

(21) Appl. No.: 10/421,470

(22) Filed: Apr. 23, 2003

(65) Prior Publication Data

US 2003/0201133 A1 Oct. 30, 2003

(30) Foreign Application Priority Data

Apr. 26, 2002 (JP) ............................. 2002-125688
May 9, 2002 (JP) ............................. 2002-133417
May 13, 2002 (JP) ............................. 2002-136366

(51) Int. Cl.
*B60K 5/02* (2006.01)

(52) U.S. Cl. ................................................ 180/291
(58) Field of Classification Search ............... 180/291, 180/292, 296, 299, 300, 89.11, 90; 296/70

See application file for complete search history.

(56) References Cited

U.S. PATENT DOCUMENTS

| 2,075,041 | A | * | 3/1937 | Kliesrath | 267/274 |
| 2,208,709 | A | * | 7/1940 | Jaarda | 180/292 |
| 2,817,557 | A | * | 12/1957 | Reynolds | 296/203.01 |
| 3,827,525 | A | * | 8/1974 | Felzer | 180/232 |
| 4,114,714 | A | | 9/1978 | Fachbach et al. | |
| 5,431,442 | A | * | 7/1995 | Tomita et al. | 280/752 |
| 5,437,344 | A | * | 8/1995 | Wada | 180/291 |
| 6,070,689 | A | * | 6/2000 | Tanaka et al. | 180/291 |
| 6,412,585 | B1 | * | 7/2002 | DeAnda | 180/291 |
| 6,523,878 | B1 | * | 2/2003 | Scheidel | 296/70 |

FOREIGN PATENT DOCUMENTS

| GB | 698659 | 7/1954 |
| JP | 06 239 147 | 8/1994 |

\* cited by examiner

*Primary Examiner*—Frank Vanaman
(74) *Attorney, Agent, or Firm*—Brooks Kushman P.C.

(57) ABSTRACT

An engine positioning structure is used for a rear wheel drive automobile, with an engine mounted in an engine compartment driving the rear wheels. In the automobile having a passenger compartment and the engine compartment, where the two compartments are separated by a dash panel, the engine is positioned so that a rotation axis of the engine is at a position higher than the height of a floor panel of the passenger compartment, and a rear end part of the engine is positioned behind a general plane defined by a position corresponding to the position of a passenger relative to a dash panel. The engine positioning structure enables a retreated layout of the engine to be obtained. It also reduces Yaw moment of inertia, and improves the steering stability.

6 Claims, 36 Drawing Sheets

ENGINE POSITIONING STRUCTURE FOR AN AUTOMOBILE

BACKGROUND OF THE INVENTION

1. Field of the Invention

The present invention relates to an engine positioning structure for a rear wheel drive automobile, the automobile having a passenger compartment and an engine compartment in front of the passenger compartment, the two compartments being separated by a dash panel, with an engine mounted in the engine compartment driving the rear wheels.

The present invention also relates to the above-described engine positioning structure having a certain power train engine positioning structure.

2. Description of Prior Art

An example of the prior art engine positioning structure for a rear-wheel drive automobile is described in Japanese Patent Unexamined Publication No. 6-239147.

Namely, as shown in FIG. 6, typical structure for FR (Front engine and Rear-wheel drive) type has passenger compartment 61 and engine compartment 63 in front of passenger compartment 61 separated by dash panel 62, such that engine 64 mounted vertically in engine compartment 63 drives rear wheels (not shown). In this connection, in the figure, 65 is a front side frame, 66 is an intercooler, 67 is a cooler condenser, and 68 is a radiator.

In this prior art structure, since the engine as a heavy load is disposed far forward from the center of the automobile in the engine compartment, there is a problem that Yaw moment of inertia becomes relatively large.

In order to reduce this Yaw moment of inertia and improve steering stability, Japanese Patent Unexamined Publication No. 2001-105833 discloses to make an air conditioning unit compact, and Japanese Patent Unexamined Publication No. 10-324141 discloses to use an air conditioning unit of film dumper key type.

By using such air conditioning units, it may be possible to retreat the engine of front-engine type to the center of the automobile, reduce the Yaw moment of inertia, and thus to improve the steering stability to a certain extent.

In order to reduce the Yaw moment of inertia more and thus improve the steering stability further, it is necessary to make the engine smaller or to employ engine layout in which the engine has more retreated position. However, since the engine cannot be made smaller unlimitedly, it is required to retreat the engine more toward the center of the automobile.

However, mere retreat of the engine creates a problem of interference between the engine and a dash panel which separates the engine compartment from the passenger compartment.

Another example of the prior art engine positioning structure for an automobile is shown in FIGS. 39 and 40.

FIG. 39 is a plan view showing a prior art engine positioning structure. FIG. 40 is a cross-sectional view of XXXX—XXXX arrows line in FIG. 39. Referring to these figures, an engine positioning structure has a passenger compartment 281 and an engine compartment 283 in front of the passenger compartment 281, the two compartments being separated by a dash lower panel 282, with an engine 284 mounted in the engine compartment 283 driving the rear wheels.

A transmission 285 is connected to the engine 284. A propeller shaft 287 is connected to an output axis 286 of the transmission by way of a universal joint. Thus, the engine 284 mounted in the engine compartment 283 drives the rear wheels.

In addition, an exhaust pipe 288 is connected to the engine 284, and this exhaust pipe 288 extends rearwardly. A catalyst 289 for cleaning an exhaust gas is connected to the extending part of the exhaust pipe 288. This catalyst 289 is positioned exterior of the automobile relative to tunnel part 291 defined at the center of floor panel 290. In this regard, when the catalyst 289 positioned exterior of the automobile relative to tunnel part 291 is mounted at a side of transmission 285 as shown in FIG. 40, it is necessary to provide a protruded part 291a to the tunnel part 291. As a result, the passenger compartment is narrowed in that amount.

Furthermore, since the reaction rate of the catalyst 289 depends on the temperature, it is required to position the catalyst as close to the engine 284 as possible. On the other hand, if the catalyst 289 is disposed at the position corresponding to the footing of the passenger as shown in FIGS. 39 and 40, that part corresponding to the footing of the passenger is heated by the exothermal reaction of the catalyst 289. In order to prevent the harm caused by the heat, it is necessary to use an insulator at a great cost.

On the other hand, as described above, considering the Yaw moment of inertia and the steering stability, it is required to retreat the engine 284 as a heavy load more toward the center of the automobile. However, mere retreat of the engine 284 creates a problem of interference between the engine 284 and a dash lower panel 282 which separates the engine compartment 283 from the passenger compartment 281.

In this connection, in FIGS. 39 and 40, 292 represents a front wheel, 293 represents a front side frame, 294 represents a lower arm of a front suspension, 295 represents a power steering, 296 represents a radiator, 297 represents a side sill, 298 represents a floor frame, and 299 represents a front seat.

Meanwhile, Japanese Patent Unexamined Publication No. 7-285347 discloses to mount an engine vertically within an engine compartment, and to position the catalyst exterior of the automobile relative to tunnel part. However, since the structure disclosed in this article is substantially the same as the one shown in FIGS. 39 and 40, it also has the above-described problem.

SUMMARY OF THE INVENTION

Accordingly, it is the first object of the present invention to provide an engine positioning structure for an automobile which makes it possible to obtain retreated layout of the engine by mounting the rear end of the engine of the FR automobile behind a general plane of a position corresponding to a passenger in the dash panel; to improve the steering stability by reducing the Yaw moment of inertia by way of the retreated position of the engine; to improve flexibility of an automobile design by making a lower hood by way of the retreated position of the engine; and to retain a collapsible space in the front part of the automobile.

It is the second object of the present invention to provide an engine positioning structure having a certain power train positioning structure for an automobile which makes it possible to obtain retreated layout of the engine by providing a cowl with a part having a reduced closed cross-section at the center part of the widthwise direction where the size of the closed cross-section is rearwardly reduced in the longitudinal direction and mounting the rear end of the engine of the FR automobile within the part of the cowl having a reduced closed cross-section; to improve the steering stability by reducing the Yaw moment of inertia; and to retain a collapsible space in the front part of the automobile.

It is the third object of the present invention to provide an engine positioning structure for a FR automobile, the engine positioning structure has means for positioning the engine so that a rotation axis of the engine is at a position higher than the height of the floor panel of the passenger compartment, and an exhaust pipe provided in the engine, the exhaust pipe being mounted such that it extends in front of the engine and then to the rear of the engine, in order to obtain retreated layout of the engine by mounting the exhaust pipe such that it extends in front of the engine; to improve the steering stability by reducing the Yaw moment of inertia; and to retain enough space in the passenger compartment by eliminating the protruding part at the tunnel part which was inevitable in the prior art.

Regarding the first aspect of the present invention, in an engine positioning structure for a rear wheel drive automobile, the automobile having a longitudinal axis and having a passenger compartment with a floor panel and an engine compartment in front of the passenger compartment, the two compartments being separated by a dash panel, with an engine mounted in the engine compartment driving the rear wheels, the engine positioning structure of the present invention has: means for positioning the engine so that a rotation axis of the engine is at a position higher than the height of the floor panel of the passenger compartment; and means for positioning a rear end part of the engine behind a general plane defined by a position corresponding to the position of a passenger relative to the dash panel.

The above-described dash panel can be a dash lower panel.

According to this structure, since a rear end part of the engine is positioned behind a general plane defined by a position corresponding to the position of a passenger relative to the dash panel, it becomes possible to obtain retreated layout of the engine. In addition, since the retreated position of the engine makes it possible to dispose the engine as a heavy load as close to the center of the automobile as possible, it becomes possible to reduce Yaw moment of inertia. As a result, the steering stability can be improved.

Furthermore, the structure make it possible to improve flexibility of an automobile design by making a lower hood by way of the retreated position of the engine, and to retain a collapsible space in the front part of the automobile.

In one embodiment of the present invention, the engine positioning structure further has a recessed engine mount space defined at a center part in the widthwise direction of the dash panel, the recessed engine mount space extending rearwardly relative to both sides of the dash panel; and means for positioning the rear end of the engine within the recessed engine mount space.

According to this structure, since the recessed engine mount space is defined at a center part in the widthwise direction of the dash panel, the retreated position of the engine is assured more.

In another embodiment of the present invention, the engine has first and second sides and the engine positioning structure further has: an intake pipe at the first side of the engine and an exhaust pipe at the second side of the engine; and the engine positioned at a predetermined angle from a vertical plane so that the intake pipe is positioned higher than the exhaust pipe.

According to this structure, since the engine is positioned at a predetermined angle from a vertical plane so that the intake pipe is positioned higher than the exhaust pipe, a mount space for the intake pipe is retained at the intake pipe side of the tilted engine, and thus the flexibility of the intake pipe layout is improved.

In another embodiment of the present invention, the engine has first and second sides and the engine positioning structure further has: an intake pipe having an intake manifold mounted to the first side of the engine so that the distances between the ends of the intake pipes connected at the engine are greater than the distances between the other ends of the intake pipes.

According to this structure, since the intake pipe is mounted to the first side of the engine so that the distances between the ends of the intake pipes connected at the engine are greater than the distances between the other ends of the intake pipes, the interference between the intake pipe and a dash panel is avoided without fault when the retreated layout of the engine is employed.

In another embodiment of the present invention, the engine positioning structure further has a plurality of intake pipes, and among the plurality of intake pipes, the rearmost intake pipe has one end connected at the engine side and its other end positioned forward of and radially away from the one end.

According to this structure, since the rearmost intake pipe has above-described layout, it becomes possible to obtain a intake pipe layout which is conscious of intake efficiency, and to reduce intake resistance.

In another embodiment of the present invention, the engine has first and second sides and the engine positioning structure further has: an exhaust pipe having an exhaust manifold mounted to the second side of the engine so that the distances between the ends of the exhaust pipes connected at the engine are greater than the distances between the other ends of the exhaust pipes.

According to this structure, since the exhaust pipe is mounted to the second side of the engine so that the distances between the ends of the exhaust pipes connected at the engine are greater than the distances between the other ends of the exhaust pipes, the interference between the exhaust pipe and a dash panel is avoided without fault when the retreated layout of the engine is employed.

In another embodiment of the present invention, the engine positioning structure further comprises a plurality of exhaust pipes, and among the plurality of exhaust pipes, the rearmost exhaust pipe has one end connected at the engine side and its other end positioned forward of and radially away from the one end.

According to this structure, since the rearmost exhaust pipe has above-described layout, it becomes possible to obtain a exhaust pipe layout which is conscious of exhaust efficiency, and to reduce exhaust resistance.

In another embodiment of the present invention, the engine positioning structure further has: a cowl which is provided at the upper part of the dash panel, the cowl having a closed cross-section structure extending in a widthwise direction; and a recessed part in the cowl which corresponds to the recessed engine mount space of the dash panel.

According to this structure, since a cowl provided at the upper part of the dash panel has the above-described recessed part, the retreated position of the engine is assured more.

In another embodiment of the present invention, the engine is a reciprocating engine mounted vertically.

According to this structure, by disposing the reciprocating engine vertically, it becomes possible to achieve a retreated disposition of such vertically mounted reciprocating engine.

Regarding the second aspect of the present invention, in an engine positioning structure for a rear wheel drive automobile, the automobile having a longitudinal axis and having a passenger compartment with a floor panel and an engine compartment in front of the passenger compartment, the two compartments being separated by a dash panel, with an engine mounted in the engine compartment driving the rear wheels, the engine positioning structure of the present invention further has: a cowl which is provided at the upper part of the dash panel, the cowl having a closed cross-section structure extending in a widthwise direction relative to the longitudinal axis; a part of the cowl having a reduced closed cross-section at the center part of the widthwise direction where the size of the closed cross-section is rearwardly reduced in the longitudinal direction; and the rear end of the engine being mounted within the part of the cowl having a reduced closed cross-section.

The above-described dash panel can be a dash lower panel.

According to this structure, since the rear end of the engine is mounted within the part of the cowl having a reduced closed cross-section defined at the center part of the widthwise direction, it becomes possible to obtain retreated layout of the engine. In addition, since it is possible to dispose the engine as a heavy load as close to the center of the automobile as possible, it becomes possible to reduce Yaw moment of inertia. As a result, the steering stability can be improved. In addition, the retreated position of the engine makes it possible to retain a collapsible space in the front part of the automobile In another embodiment of the present invention, the cowl has a reinforcement panel connected to the part of the cowl having a closed cross-section of regular size so that the reinforcement panel covers the part of the cowl having a reduced closed cross-section.

According to this structure, since the reinforcement panel covers the part having a reduced closed cross-section, and the reinforcement panel connects to the part of the cowl having a regular closed cross-section, the rigidity of the cowl is assured by the reinforcement panel.

In another embodiment of the present invention, the reinforcement panel is formed in the shape of a box having a closed cross-section of the panel.

According to this structure, since the reinforcement panel is formed in the shape of a box having a closed cross-section of the panel, the rigidity of the cowl can be improved.

In another embodiment of the present invention, the reinforcement panel is removably mounted to the cowl.

According to this structure, since the reinforcement panel is removably mounted to the cowl, service or maintenance of the engine or engine accessories becomes easier, especially, when a spark plug needs to be replaced.

In another embodiment of the present invention, the engine positioning structure further has a wiper module mounted on the reinforcement panel.

According to this structure, the wiper module can be attached by using the reinforcement panel effectively.

In another embodiment of the present invention, the reinforcement panel and/or the wiper module are mounted on the cowl such that the reinforcement panel and/or the wiper module are disengaged and dropped from the cowl when a predetermined or more load applies thereto from above the cowl.

According to this structure, safety of pedestrians can be facilitated. Specifically, when an automobile collides with a pedestrian, and the pedestrian tumbles on a hood of the automobile, since at least one of the reinforcement panel and the wiper module is disengaged and dropped from the cowl by the load caused by the tumble of the pedestrian, the load applied by the wiper module, especially by a wiper pivot thereof, to the pedestrian is reduced, and thus the safety of pedestrians can be facilitated.

In another embodiment of the present invention, the engine positioning structure further has a washer tank mounted on the reinforcement panel.

In this regard, the washer tank is a means for reserving a detergent which is sprayed to a front shield glass when the front view needs to be assured.

According to this structure, by using the reinforcement panel effectively, a washer tank can be mounted on a dead space, and a layout which serves for the pass of the detergent is achieved.

In another embodiment of the present invention, the engine positioning structure further has: an instrument panel member extending in a widthwise direction; an instrument panel supported by the instrument panel member; and an air conditioning unit, the instrument panel member and the air conditioning unit are located in the rear of the cowl, and the instrument panel member is located so that the instrument panel member overlaps with the position of the air conditioning unit.

According to this structure, since the instrument panel member is located so that the instrument panel member overlaps with the position of the air conditioning unit, an engine layout in which the engine has more retreated position can be achieved, and a layout of an instrument panel member and that of air conditioning unit can be reconciled.

In another embodiment of the present invention, the engine positioning structure further comprises: an instrument panel member extending in a widthwise direction; and an instrument panel supported by the instrument panel member, the instrument panel member and the air conditioning unit are located in the rear of the cowl, and the instrument panel member being located rearwardly of the position corresponding to the part of the cowl that has a reduced closed cross-section and in conformance with the part of the cowl that has a reduced closed cross-section.

According to this structure, since the instrument panel member is located rearwardly and in conformance with the part of the cowl that has a reduced closed cross-section, the part having a reduced closed cross-section can be enlarged to some extent corresponding to the curve of the instrument panel member. As a result, the rigidity of the cowl, which contributes to the rigidity of an automobile body, is assured, and thus the rigidity of the automobile body is improved. In addition, since a layout space for the wiper module is retained, the wiper module can be mounted to the part having a reduced closed cross-section.

In another embodiment of the present invention, the dash panel is mounted under the cowl, and the dash panel is recessed in conformance with the part of the cowl having a reduced closed cross-section.

According to this structure, since the dash panel is recessed in conformance with the part of the cowl having a reduced closed cross-section, the retreated position of the engine is assured more.

Regarding the third aspect of the present invention, in an engine positioning structure for a rear wheel drive automobile, the automobile having a longitudinal axis and having a passenger compartment with a floor panel and an engine compartment in front of the passenger compartment, the two compartments being separated by a dash panel, with an engine mounted in the engine compartment driving the rear wheels, the engine positioning structure of the present invention has: means for positioning the engine so that a rotation axis of the engine is at a position higher than the height of the floor panel of the passenger compartment; and an exhaust pipe provided in the engine, the exhaust pipe being mounted such that it extends in front of the engine and then to the rear of the engine.

The above-described dash panel can be a dash lower panel. In addition, the engine can be a rotary engine. Furthermore, the rotation axis of the engine can be an eccentric shaft.

According to this structure, since the exhaust pipe is mounted such that it extends in front of the engine and then to the rear of the engine, it becomes possible to obtain retreated layout of the engine. In addition, since the Yaw moment of inertia is reduced, the steering stability can be improved. Furthermore, since the protruding part at the tunnel part which was inevitable in the prior art is eliminated, it is possible to retain enough space in the passenger compartment. Moreover, the retreated layout of the engine makes it possible to improve flexibility of an automobile design by making a lower hood.

In one embodiment of the present invention, the engine positioning structure further has: a catalyst provided in the exhaust pipe, the catalyst being mounted in front of the engine in a widthwise direction.

According to this structure, since a catalyst is provided in the exhaust pipe passing in front of the engine, and the catalyst is mounted in front of the engine in a widthwise direction, the tunnel part does not protrude into the passenger compartment. In addition, there is no need to provide an insulator to the tunnel part in order to prevent a harm caused by the heat. Furthermore, since the catalyst is disposed as close to the engine as possible in front of the engine, an appropriate reaction of the catalyst can be achieved.

In another embodiment of the present invention, a cleaning unit is mounted in front of the catalyst.

The cooling unit can be a combination of a radiator and a cooling fan.

According to the structure, a layout of the catalyst and that of the cooling unit can be reconciled in the engine compartment. In addition, it is possible to cool the catalyst by using the cooling unit.

In another embodiment of the present invention, the engine positioning structure further has a shielding panel provided between the catalyst and the engine compartment.

According to the structure, the shielding panel prevents an accessory in the engine compartment from being adversely affected by the heat from the catalyst. Thus, the harm caused by the heat can be prevented.

In another embodiment of the present invention, the shielding panel has a wind guide part which leads a passing wind and/or a running wind of the cleaning unit to the catalyst.

According to the structure, since a passing wind and/or a running wind of the cleaning unit are led to the catalyst, the catalyst can be cooled (air-cooled) more effectively.

In another embodiment of the present invention, the shielding panel has a wind guide part which leads air outside the engine compartment to the catalyst.

According to the structure, the catalyst can be cooled more appropriately by using the air outside the engine compartment.

In another embodiment of the present invention, the shielding panel connects to a suspension cross member and operates as a rigid member.

According to this structure, since the shielding panel is connected to a suspension cross member, it is possible to improve the supporting rigidity of the shielding panel. In addition, the rigidity of the automobile body can be also improved by the connecting structure.

In another embodiment of the present invention, the engine positioning structure further has a wind guide duct leading a running wind directly to the catalyst and carrying out cooling thereby.

According to the structure, since a running wind is led directly to the catalyst, the catalyst can be cooled more effectively.

In another embodiment of the present invention, the wind guide part consists of a wind guide duct, and an inner duct is provided between the wind guide duct and the catalyst.

According to this structure, since an inner wind guide path passing through the catalyst and an outer wind guide path between the inner duct and the wind guide duct are formed simultaneously, these paths effectively prevent an accessory in the engine compartment from being affected by the heat from the catalyst.

In another embodiment of the present invention, the wind guide duct which leads a running wind directly to the catalyst and a duct which leads a running wind to a radiator are offset from each other in a widthwise direction.

According to this structure, a layout of the catalyst and that of the radiator can be reconciled. In addition, since a running wind is led directly to both the catalyst and radiator, it is possible to cool both of them effectively.

In another embodiment of the present invention, the engine positioning structure further has: an engine mount space formed at the center part of the widthwise direction of the dash panel and recessed in relation to both sides of the dash panel in a rearward direction; and the rear end of the engine is mounted within the recessed engine mount space.

According to this structure, since the rear end of the engine is mounted within the recessed engine mount space, the retreated position of the engine is assured more.

In another embodiment of the present invention, the engine is mounted at an angle relative to a vertical plane that the side of exhaust system is higher than it would have been in if the engine was not mounted at the specified angle.

According to this structure, since the slant direction of the engine is determined as described above, the flexibility of the layout for the exhaust system is improved In another embodiment of the present invention, an intake port is located at the upper part of the engine.

According to this structure, since the intake port is located at the upper part of the engine, the flexibility of the layout for the intake system is improved. In addition, it becomes easier to handle the intake pipe.

In another embodiment of the present invention, the engine is a rotary engine mounted vertically.

According to this structure, since the engine is a rotary engine mounted vertically in the engine compartment, each of above-described advantages of the present invention becomes more significant.

DESCRIPTION OF THE PREFERRED EMBODIMENT

With referring to FIGS. 1 to 5, the first aspect of the present invention will be explained in detail hereinafter.

Figure 1:
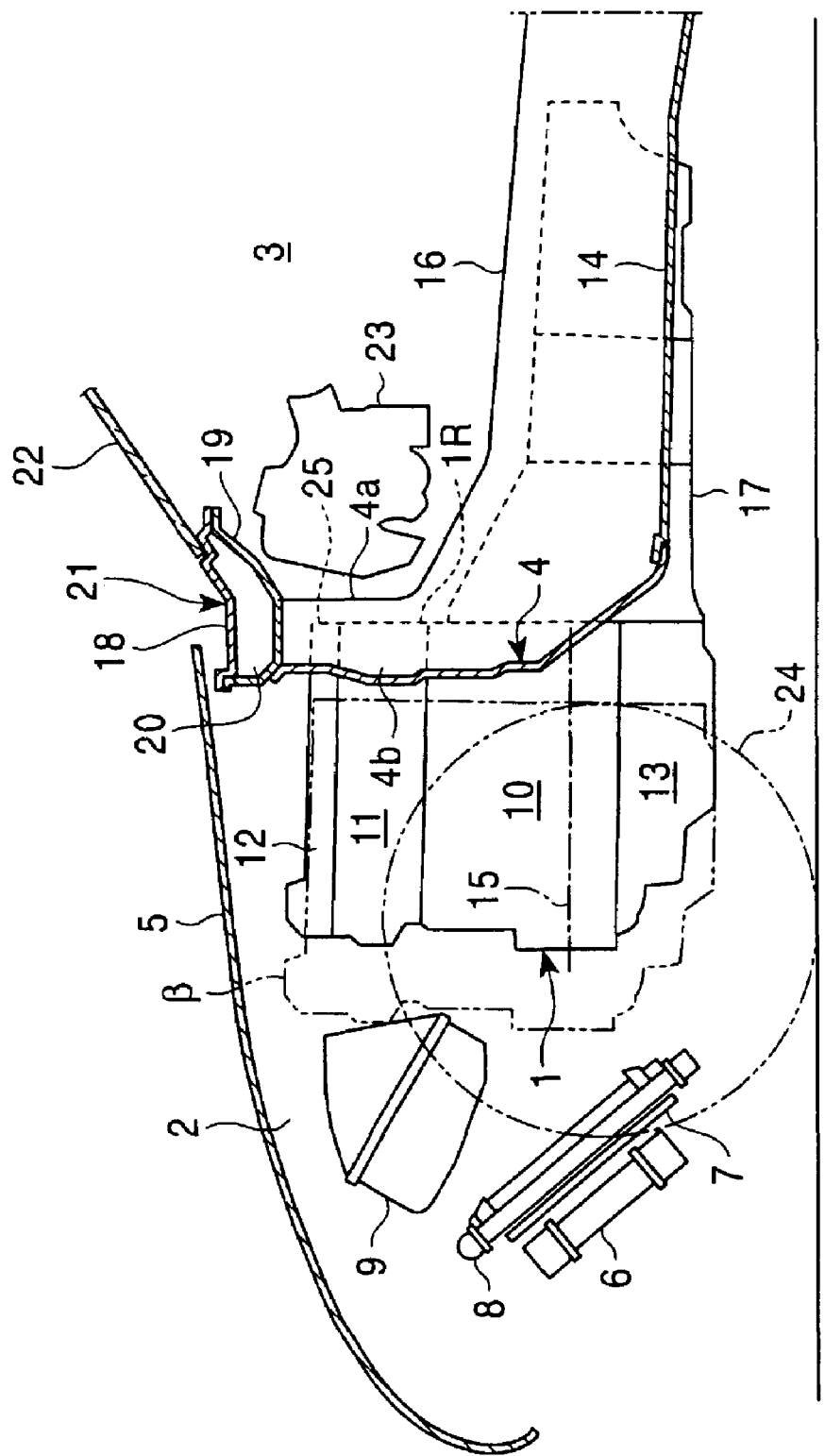
FIG. 1 is a side view showing an engine positioning structure for an automobile of the first embodiment of the present invention.

Referring to FIG. 1 showing an engine positioning structure for an automobile, engine compartment 2 in which engine 1 is mounted and passenger compartment 3 on which passengers ride are separated as compartments by dash lower panel 4 as partitioning means.

The upper part of engine compartment 2, which is in front of passenger compartment 3 and separated therefrom by dash lower panel 4, is covered by hood 5 which can be opened and closed. In engine compartment 2, in front of engine 1, inter cooler 6, cooler condenser 7 for air conditioning and radiator 8 are all disposed on the tilt such that their front parts are higher than their rear parts. Air cleaner 9 as air cleaning means is disposed between radiator 8 and engine 1.

The engine 1 has cylinder block 10, cylinder head 11, cylinder head cover 12 and oil pan 13. In this embodiment, a reciprocating engine, specifically an in-line four cylinder engine is disposed vertically.

A floor panel 14, which constitutes a floor of the passenger compartment, is provided at the rear end of dash lower panel 4. In this regard, engine 1 is disposed such that axis core line 15 of a crankshaft as an engine rotation axis of the engine is at a position higher than the height of floor panel 14 of passenger compartment 3.

Behind engine 1, transmission 17 is connected so that it is positioned exterior of the automobile relative to tunnel part 16 of floor panel 14. The engine 1 and transmission 17 constitute a power train, and engine 1 drives rear wheels by way of transmission 17 and a propeller shaft.

At the upper part of dash lower panel 4, cowl 21 (automobile body rigid member) is provided, and it has a structure of closed cross-section 20 obtained by binding cowl upper panel 18 and cowl lower panel 19 and extending in the widthwise direction. At the upper part of closed cross-section of cowl 21, front shield glass 22 is mounted.

Between dash lower panel 4 and instrument panel, air conditioning unit 23 is mounted as close to engine 1 as possible. In this connection, in FIG. 1, 24 is a front wheel.

Figure 2:
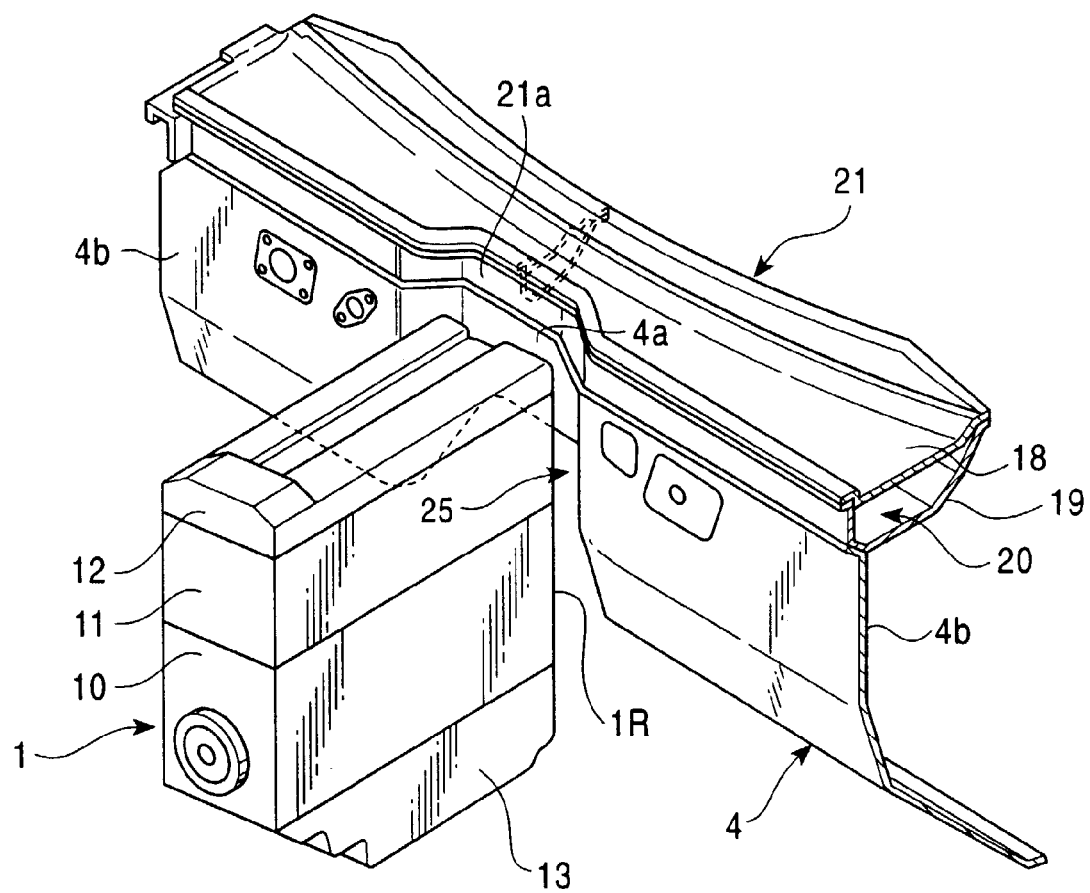
FIG. 2 is a perspective view showing an essential part of FIG. 1.

With referring to FIG. 2, which is a perspective view showing an essential part of FIG. 1, center part 4a of the widthwise direction of dash lower panel 4 recesses rearwardly relative to both sides of dash lower panel 4, namely, general plane 4b of the position corresponding to the position of a passenger. An engine mount space 15 is defined in front of center part 4a, and rear end part 1R of engine 1 is mounted within this engine mount space 25.

In addition, corresponding to engine mount space 25, recessed part 21a is formed in cowl 21 provided to the upper part of dash lower panel 4.

Figure 3:
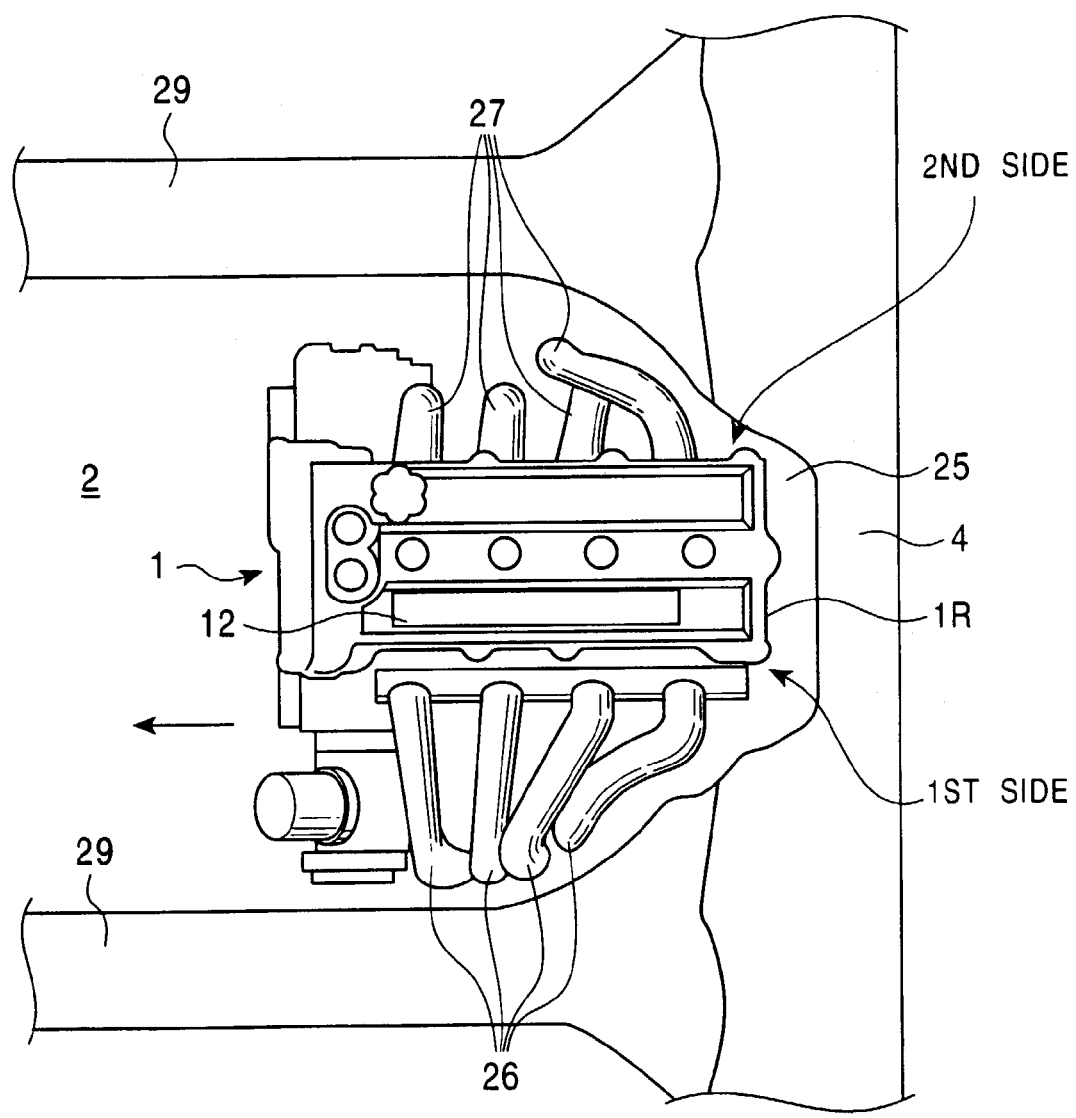
FIG. 3 is a plan view of FIG. 2.
Figure 4:
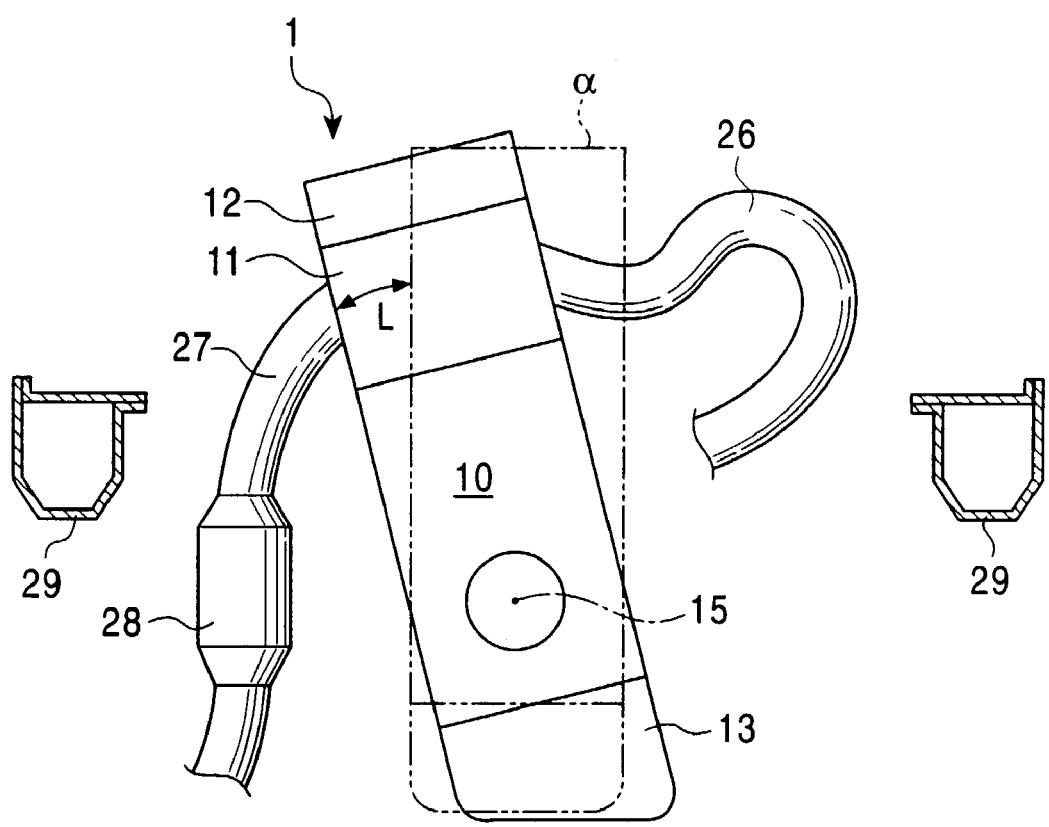
FIG. 4 is a front view of FIG. 2.

With referring to FIG. 3, which is a plan view of FIG. 2, and FIG. 4, which is a front view of FIG. 2, a plurality of intake pipes 26 . . . are mounted at the first side of cylinder head 11 in engine 1 and a plurality of exhaust pipes 27 . . . are mounted at the second side thereof. Referring to FIG. 4, engine 1 is mounted at a predetermined angle from a vertical plane so that the intake pipe 26 is positioned higher than the exhaust pipe 27.

Figure 29:
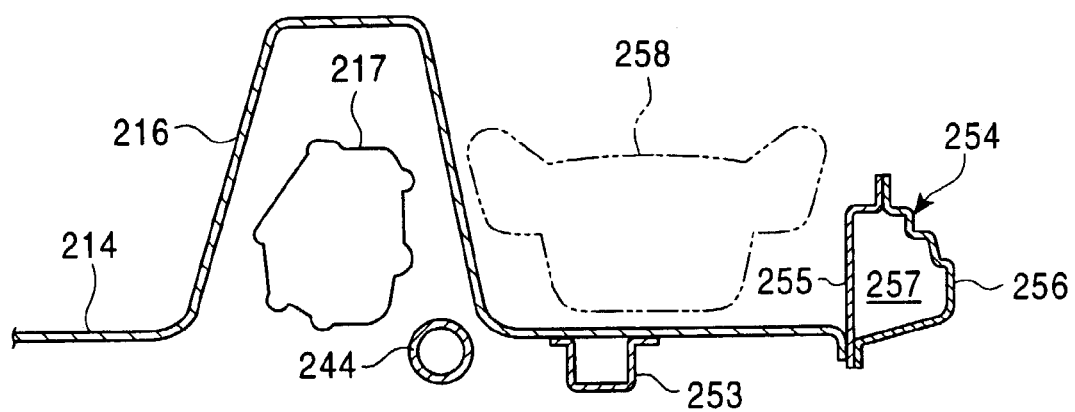
FIG. 29 is a cross-sectional view of XXIX—XXIX arrows line in FIG. 28.

Referring to FIG. 4, an engine of upright layout which is not tilted is shown by imaginary line a. As shown by solid line in FIG. 4, by mounting engine 1 at a predetermined angle from a vertical plane so that the intake pipe 26 is positioned higher than the exhaust pipe, since the mount space for intake pipe 26 is enlarged, the flexibility of the layout for intake pipe 26 is improved. On the other hand, at the exhaust pipe side, the space between the opening end of the exhaust port in cylinder head 11 and the upstream end of exhaust pipe 27 is shortened in distance L. In this regard, it is effective to provide catalyst 28 at the downstream of the merging point of a plurality of exhaust pipes 27, because catalyst 28 can be mounted closer to the opening end of the exhaust port in distance L. In this connection, in FIGS. 3 and 4, 29 represents a front side frame as a rigid member extending lengthwise of the automobile.

Referring to FIG. 3 showing a plan view, intake pipes 26 disposed in the left side of cylinder head 11 have an intake manifold. These intake pipes 26 are mounted so that the distances between the ends connected to the cylinder head 11 of engine 1 of the intake pipes 26 are greater than the distances between the other ends of the intake pipes 26.

Moreover, among the plurality of intake pipes 26, the rearmost exhaust pipe 26 (the intake pipe which is shown in the right side in FIG. 3, and is on the side close to dash lower panel 4) is mounted such that the intake pipe 26 has one end connected at the engine 1 side and its other end positioned forward of and radially away from the one end.

Similarly, referring to FIG. 3, exhaust pipes 27 disposed in the right (second) side of cylinder head 11 have an exhaust manifold. These exhaust pipes 27 are mounted so that the distances between the ends connected to the cylinder head 11 of engine 1 of the exhaust pipes 27 are greater than the distances between the other ends of the exhaust pipes 27.

Moreover, among the plurality of exhaust pipes 27, the rearmost exhaust pipe 27 (the exhaust pipe which is shown in the right side in FIG. 3, and is on the side close to dash lower panel 4) is mounted such that the exhaust pipe 27 has one end connected at the engine 1 side and its other end positioned forward of and radially away from the one end.

Accordingly, in an engine positioning structure for a rear wheel drive automobile, the automobile having a longitudinal axis and having a passenger compartment 3 with a floor panel and an engine compartment 2 in front of the passenger compartment 3, the two compartments being separated by a dash panel 4, with an engine 1 mounted in the engine compartment 2 driving the rear wheels, the embodiment of the engine positioning structure shown in FIGS. 1 to 4 has: means for positioning the engine 1 so that a rotation axis (see axis core line 15 of a crankshaft) of the engine 1 is at a position higher than the height of the floor panel 14 of the passenger compartment 3; and means for positioning a rear end part 1R of the engine 1 behind a general plane 4b defined by a position corresponding to the position of a passenger relative to the dash lower panel 4.

According to this structure, since a rear end part 1R of the engine 1 is positioned behind a general plane 4b defined by a position corresponding to the position of a passenger relative to the dash lower panel 4, it becomes possible to obtain retreated layout of the engine 1. Namely, a central midengine is obtained by employing the retreated layout of the engine 1 as shown by the solid line in FIG. 1 instead of the conventional engine position as shown by the imaginary line β in FIG. 1. In addition, since the retreated position of the engine 1 makes it possible to dispose the engine 1 as a heavy load as close to the center of the automobile as possible, it becomes possible to reduce Yaw moment of inertia. As a result, the steering stability can be improved.

Furthermore, the retreated position of engine 1 makes it possible to improve flexibility of an automobile design by making a lower hood, and to retain a collapsible space in the front part of the automobile.

In addition, the engine positioning structure further has a recessed engine mount space 25 defined at a center part 4a in the widthwise direction of the dash lower panel 4, the recessed engine mount space 25 extending rearwardly relative to both sides of the dash lower panel 4; and means for positioning the rear end 1R of the engine 1 within the recessed engine mount space 25.

According to this structure, since the recessed engine mount space 25 is defined at a center part 4a in the widthwise direction of the dash lower panel 4, the retreated position of the engine 1 is assured more.

Furthermore, as shown in FIG. 4, the engine 1 has first and second sides and the engine positioning structure further has: an intake pipe 26 at the first side of the engine 1 and an exhaust pipe 27 at the second side of the engine 1; and the engine 1 positioned at a predetermined angle from a vertical plane so that the intake pipe is positioned higher than the exhaust pipe.

According to this structure, since the engine 1 is positioned at a predetermined angle from a vertical plane so that the intake pipe 26 is positioned higher than the exhaust pipe 27, a mount space for the intake pipe 26 is retained at the intake pipe 26 side of the tilted engine, and thus the flexibility of the intake pipe 26 layout is improved.

Moreover, the engine 1 has first and second sides and the engine positioning structure further has: an intake pipe 26 having an intake manifold mounted to the first side of the engine 1 so that the distances between the ends connected at the engine 1 of the intake pipes 26 are greater than the distances between the other ends of the intake pipes 26.

According to this structure, since the intake pipe 26 is mounted to the first side of the engine 1 so that the distances between the ends of the intake pipes 26 connected at the engine 1 are greater than the distances between the other ends of the intake pipes 26, the interference between the intake pipe 26 and a dash lower panel 4 is avoided without fault when the retreated layout of the engine 1 is employed.

In addition, the engine positioning structure further has a plurality of intake pipes 26, and among the plurality of intake pipes 26, the rearmost intake pipe 26 has one end connected at the engine 1 side and its other end positioned forward of and radially away from the one end.

According to this structure, since the rearmost intake pipe 26 has above-described layout, it becomes possible to obtain a intake pipe layout which is conscious of intake efficiency, and to reduce intake resistance.

Similarly, the engine 1 has first and second sides and the engine positioning structure further has: an exhaust pipe 27 having an exhaust manifold mounted to the second side of the engine 1 so that the distances between the ends of the exhaust pipes 27 connected at the engine 1 are greater than the distances between the other ends of the exhaust pipes 27.

According to this structure, since the exhaust pipe 27 is mounted to the second side of the engine 1 so that the distances between the ends of the exhaust pipes 27 connected at the engine 1 are greater than the distances between the other ends of the exhaust pipes 27, the interference between the exhaust pipe 27 and a dash lower panel 4 is avoided without fault when the retreated layout of the engine 1 is employed.

In addition, the engine positioning structure further comprises a plurality of exhaust pipes 27, and among the plurality of exhaust pipes 27, the rearmost exhaust pipe 27 has one end connected at the engine side 1 and its other end positioned forward of and radially away from the one end.

According to this structure, since the rearmost exhaust pipe 27 has above-described layout, it becomes possible to obtain an exhaust pipe 27 layout which is conscious of exhaust efficiency, and to reduce exhaust resistance.

Furthermore, the engine positioning structure further has: a cowl 21 which is provided at the upper part of the dash lower panel 4, the cowl 21 having a closed cross-section 20 structure extending in a widthwise direction; and a recessed part 21*a* in the cowl 21 which corresponds to the recessed engine mount space 25 of the dash lower panel 4.

According to this structure, since a cowl 21 provided at the upper part of the dash lower panel 4 has above-described recessed part 21*a*, the retreated position of the engine 1 is assured more.

Moreover, the engine 1 is a reciprocating engine mounted vertically.

According to this structure, by disposing the reciprocating engine vertically, it becomes possible to achieve a retreated disposition of such vertically mounted reciprocating engine.

Figure 5:
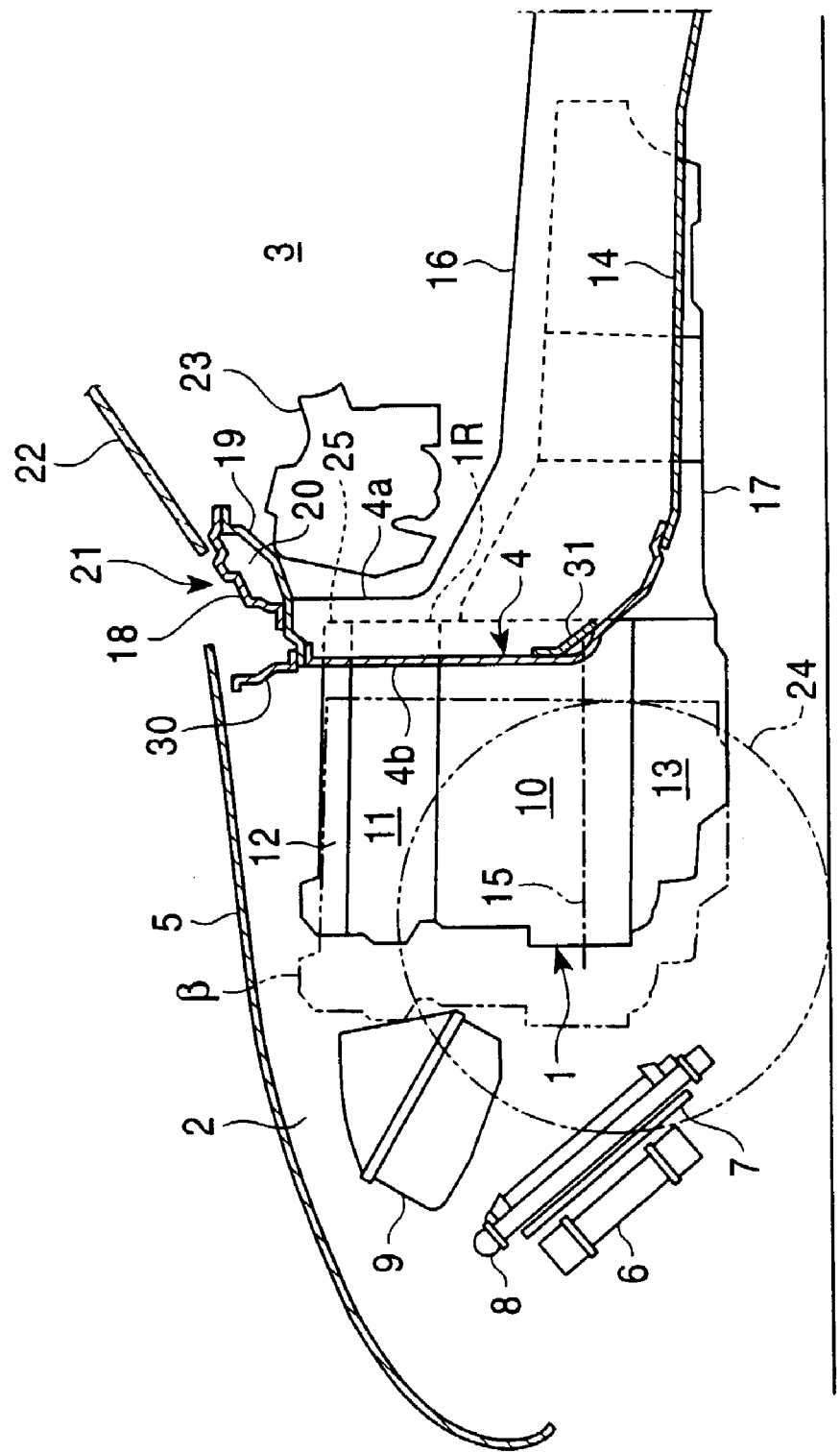
FIG. 5 is a side view showing an engine positioning structure for an automobile of another embodiment the present invention.
Figure 6:
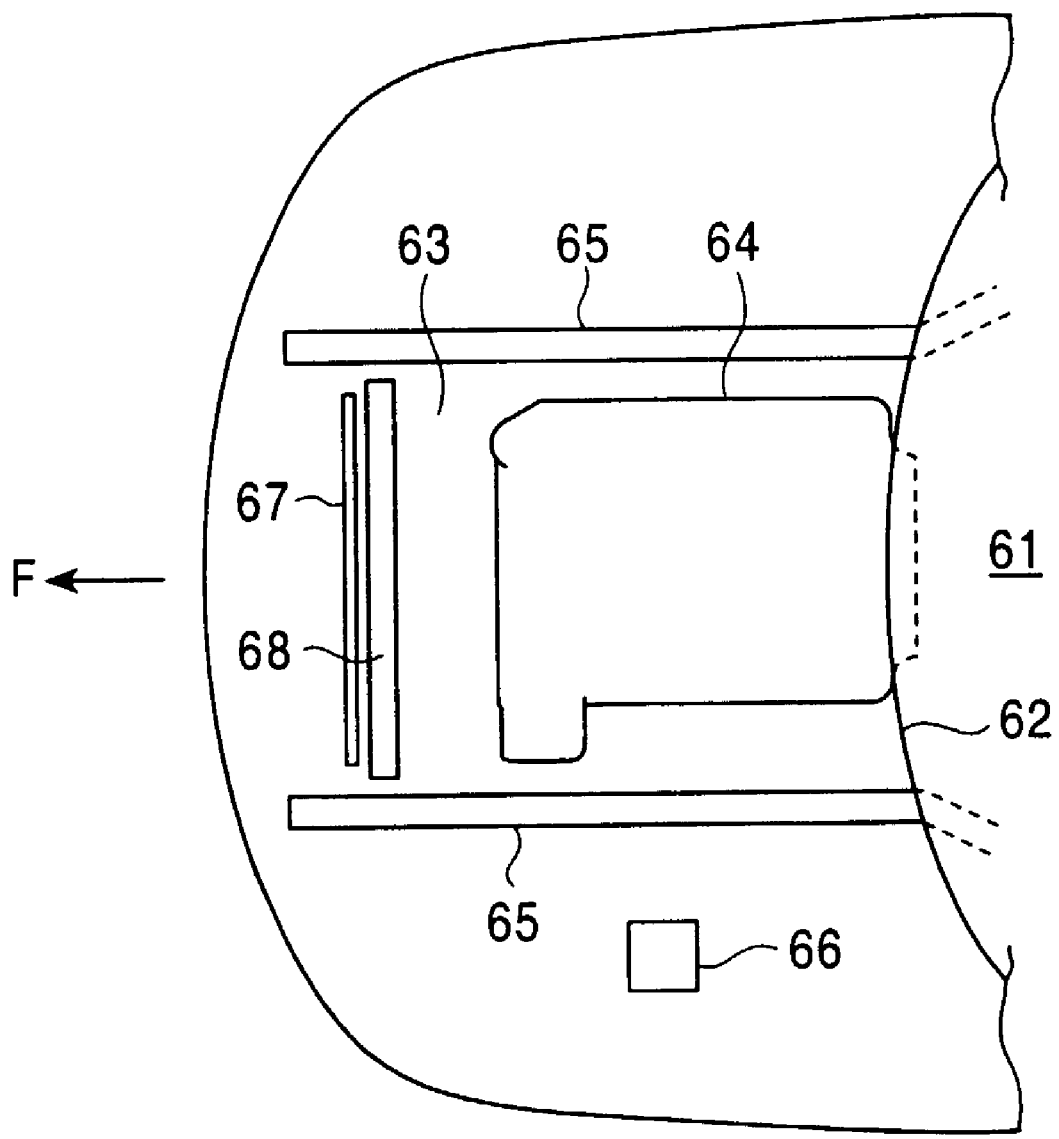
FIG. 6 is a side view showing an engine positioning structure for an automobile of the prior art.

Referring to FIG. 5 showing another embodiment of the engine positioning structure for an automobile of the present invention, cowl upper panel 18, cowl lower panel 19 and dash upper panel 30 constitute cowl 21 as a rigid member for an automobile body extending in the widthwise direction. A dash cross member 31 is bound to the lower part of dash lower panel 4 in order to improve the stiffness of panel 4.

In this embodiment, again, the engine positioning structure has a recessed engine mount space 25 defined at a center part 4*a* in the widthwise direction of the dash lower panel 4; and a recessed part 21*a* in the cowl 21 which corresponds to the recessed engine mount space 25 of the dash lower panel 4.

For this embodiment, almost the same structures, operations and advantages as those for the previous embodiment are achieved. Thus, the same reference numbers used in the previous drawings are used in FIG. 5 for referring to the same elements, and detailed explanation is omitted.

Comparing the elements of the present invention with those in the embodiments described herein, the engine rotation axis of the present invention corresponds to axis core line 15 of the crankshaft in the embodiment, and the dash panel corresponds to dash lower panel 4. However, the scope of the present invention is not limited to the above-described embodiments.

According to the present invention, since a rear end part of the engine of a FR automobile is positioned behind a general plane defined by a position corresponding to the position of a passenger relative to the dash panel, it becomes possible to obtain retreated layout of the engine. In addition, since the retreated position of the engine makes it possible to dispose the engine as a heavy load as close to the center of the automobile as possible, it becomes possible to reduce Yaw moment of inertia. As a result, the steering stability can be improved. Furthermore, the structure makes it possible to improve flexibility of an automobile design by making a lower hood by way of the retreated position of the engine, and to retain a collapsible space in the front part of the automobile.

With referring to FIGS. 7 to 26, the second aspect of the present invention will be explained in detail hereinafter.

Figure 7:
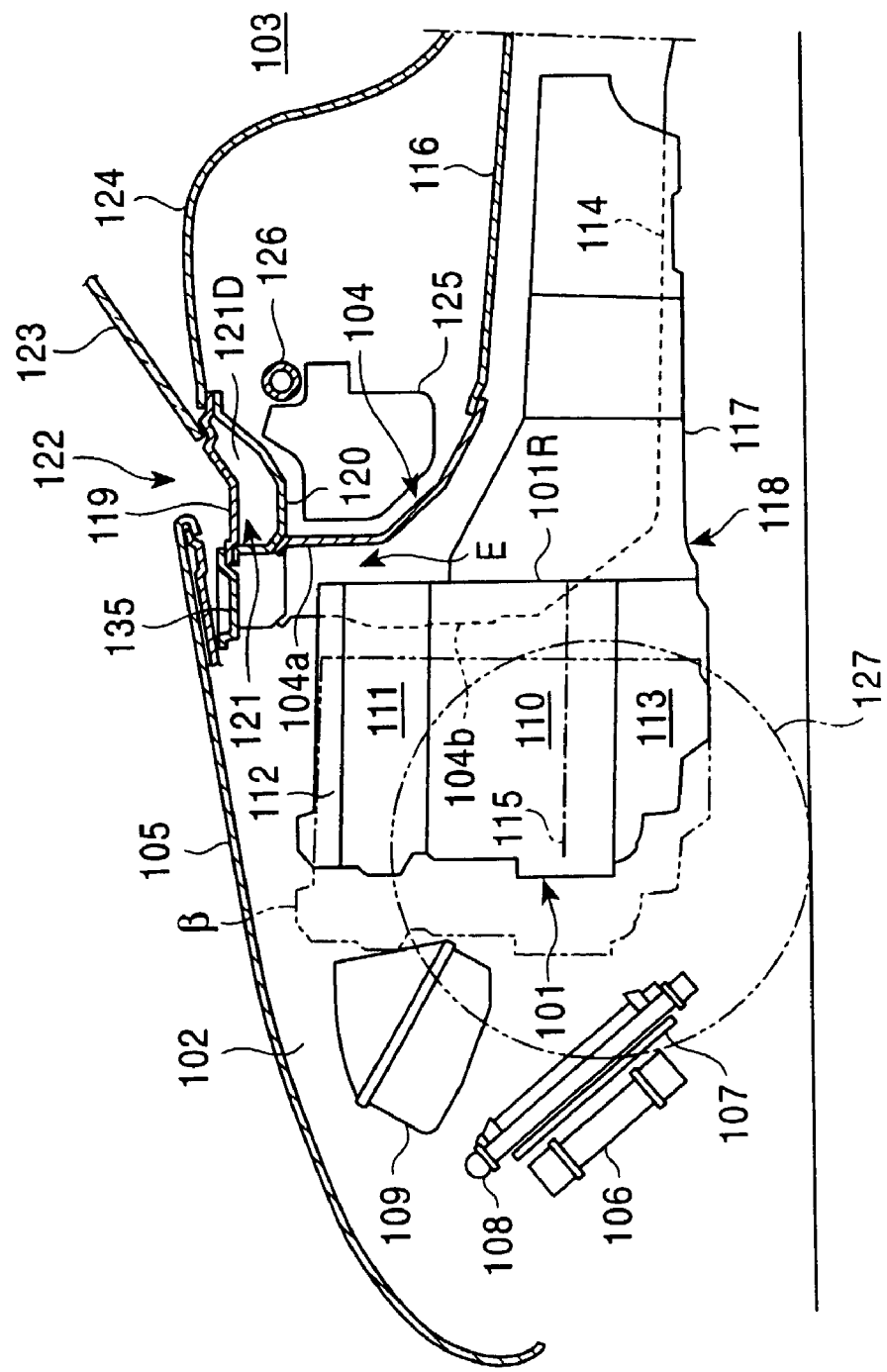
FIG. 7 is a side view showing an engine positioning structure for an automobile of the second embodiment of the present invention.

Referring to FIG. 7 showing an engine positioning structure for an automobile, engine compartment 102 in which engine 101 is mounted and passenger compartment 103 on which passengers ride are separated as compartments by dash lower panel 104 as partitioning means.

The upper part of engine compartment 102, which is in front of passenger compartment 103 and separated therefrom by dash lower panel 104, is covered by hood 105 which can be opened and closed. In engine compartment 102, in front of engine 101, inter cooler 106, cooler condenser 107 for air conditioning and radiator 108 are all disposed on the tilt such that their front parts are higher than their rear parts. Air cleaner 109 as air cleaning means is disposed between radiator 108 and engine 101.

The engine 101 has cylinder block 110, cylinder head 111, cylinder head cover 112 and oil pan 113. In this embodiment, a reciprocating engine, specifically an in-line four cylinder engine is disposed vertically.

A floor panel 114, which constitutes a floor of the passenger compartment, is provided at the rear end of dash lower panel 104. In this regard, engine 101 is disposed such that axis core line 115 of a crankshaft as an engine rotation axis of the engine is at a position higher than the height of floor panel 114 of passenger compartment 103.

Behind engine 101, transmission 117 is connected so that it is positioned exterior of the automobile relative to tunnel part 116 of floor panel 114. The engine 101 and transmission 117 constitute a power train 118, and engine 101 drives rear wheels by way of transmission 117, a propeller shaft and a rear differential device.

At the upper part of dash lower panel 104, cowl 122 (automobile body rigid member) is provided, and it has a structure of closed cross-section 121 obtained by binding cowl upper panel 119 and cowl lower panel 120 and extending in the widthwise direction. At the upper part of closed cross-section of cowl 122, front shield glass 123 is mounted.

Between dash lower panel 104 and instrument panel 124, air conditioning unit 125 is mounted as close to engine 101 as possible. On the other hand, an instrument panel member 126 extending in a widthwise direction is located in the rear of the cowl 122. The instrument panel member 126 connects to panels, specifically pillar inner panels of right and left hinge pillars, at both sides of the automobile body. The instrument panel member 126 also supports the instrument panel 124. In this regard, the instrument panel member 126 is located so that it overlaps with the position of the air conditioning unit 125. In this connection, in FIG. 7, 127 is a front wheel.

Figure 8:
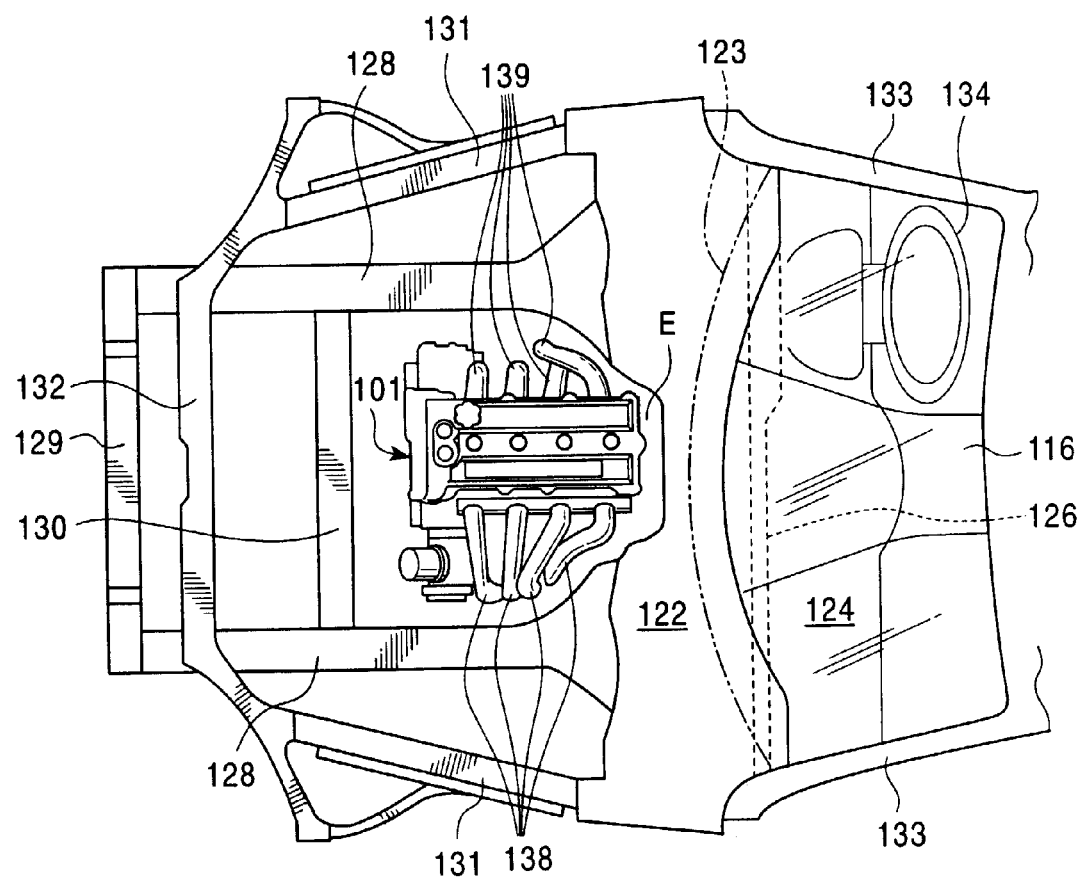
FIG. 8 is a plan view showing an essential part of FIG. 7.

FIG. 8 is a plan view showing an essential part of FIG. 7, and a pair of left and right front side frame 128, 128 extending in the longitudinal direction are located in the front part of the automobile body. A bumper reinforcement 129 extending in the widthwise direction is attached to the front ends of these front side frames 128, 128.

In addition, a front cross member 130 bridges between the left and right front side frames 128, 128 at the position behind bumper reinforcement 129.

Furthermore, apron reinforcements 131, 131 diagonally extend from both ends of cowl 122 to the front part of the automobile. A shroud member 132 extending in the widthwise direction is attached between the front ends of the left and right apron reinforcements 131, 131. Each of these elements 128, 129, 130, 131 and 132 is a rigid member. In this connection, in FIG. 8, 133 represents a front pillar, and 134 represents a steering wheel.

Figure 9:
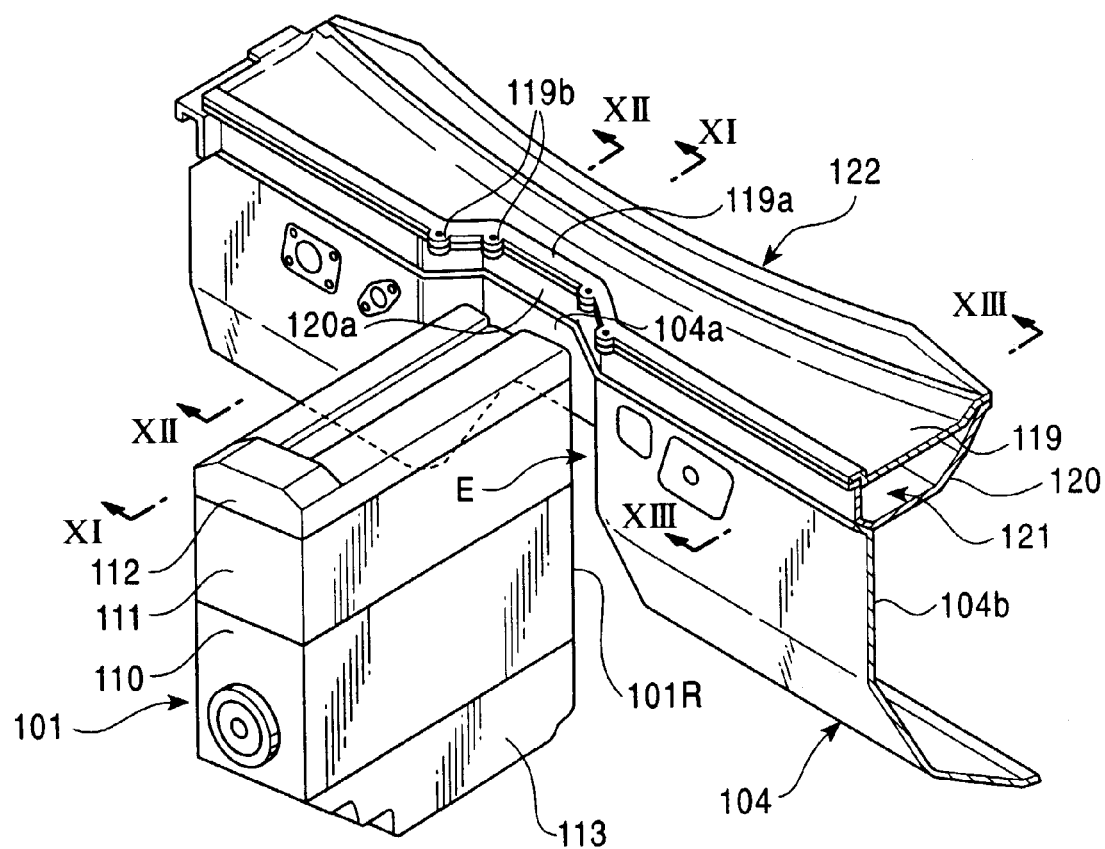
FIG. 9 is a perspective view showing an essential part of FIG. 7.

With referring to FIG. 9, which is a perspective view showing an essential part of FIG. 7, center part 104*a* of the widthwise direction of dash lower panel 104 recesses rearwardly relative to both sides of dash lower panel 104, namely, general plane 104*b* of the position corresponding to the position of a passenger. An engine mount space E is defined in front of center part 104*a*, and rear end part 101R of engine 101 is mounted within this engine mount space E.

Figure 10:
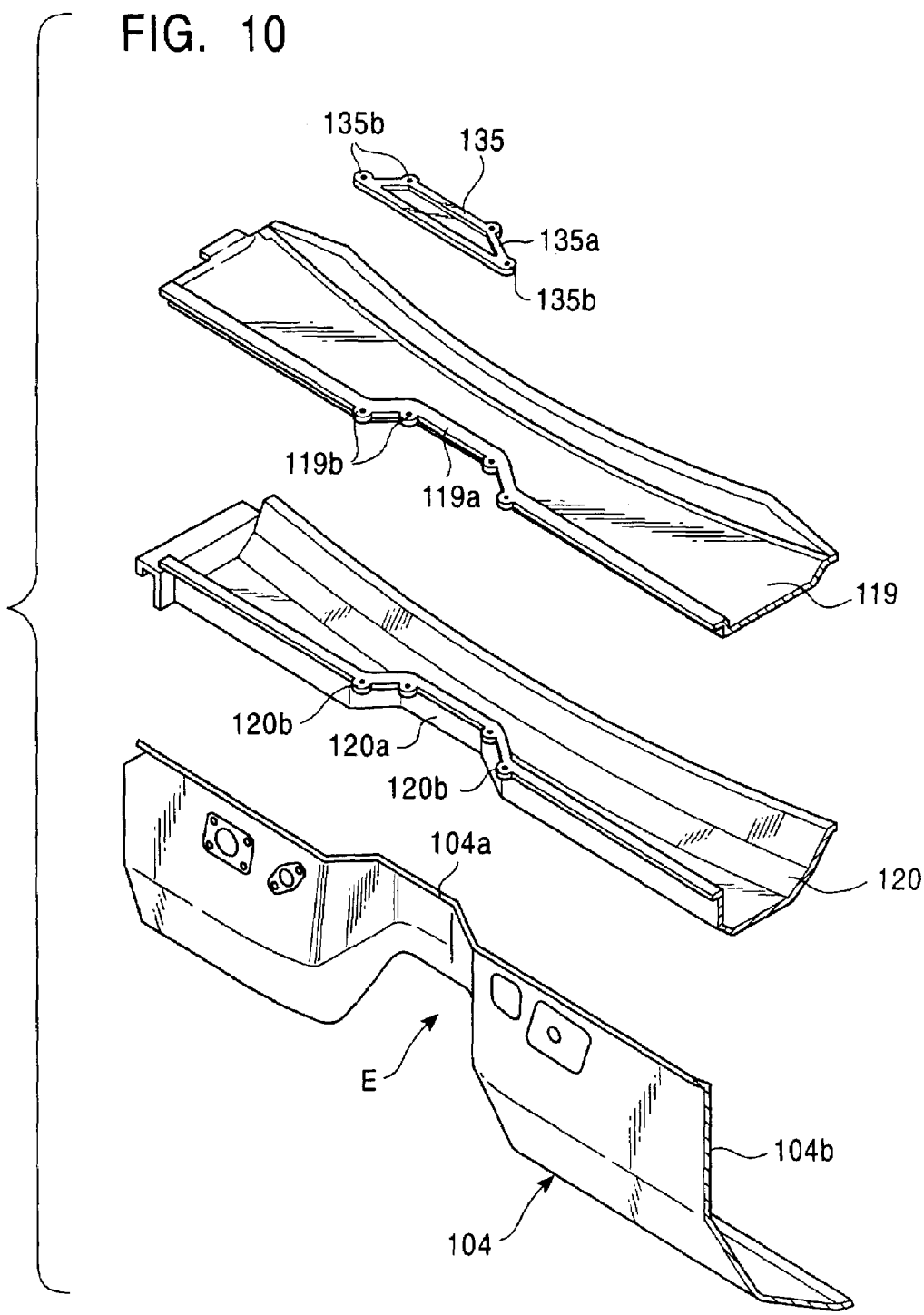
FIG. 10 is a decomposed perspective view showing an essential part of FIG. 9.
Figure 11:
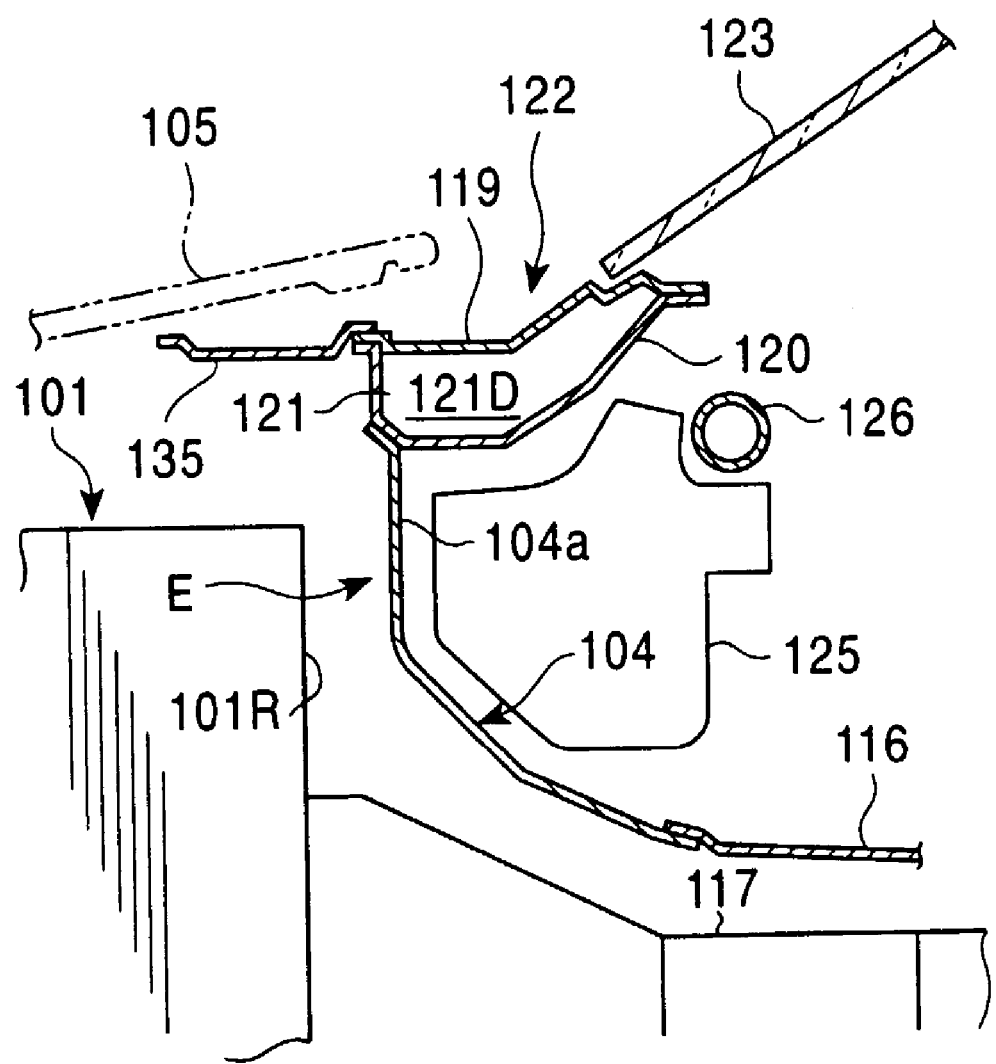
FIG. 11 is a cross-sectional view of XI—XI arrows line in FIG. 9.
Figure 12:
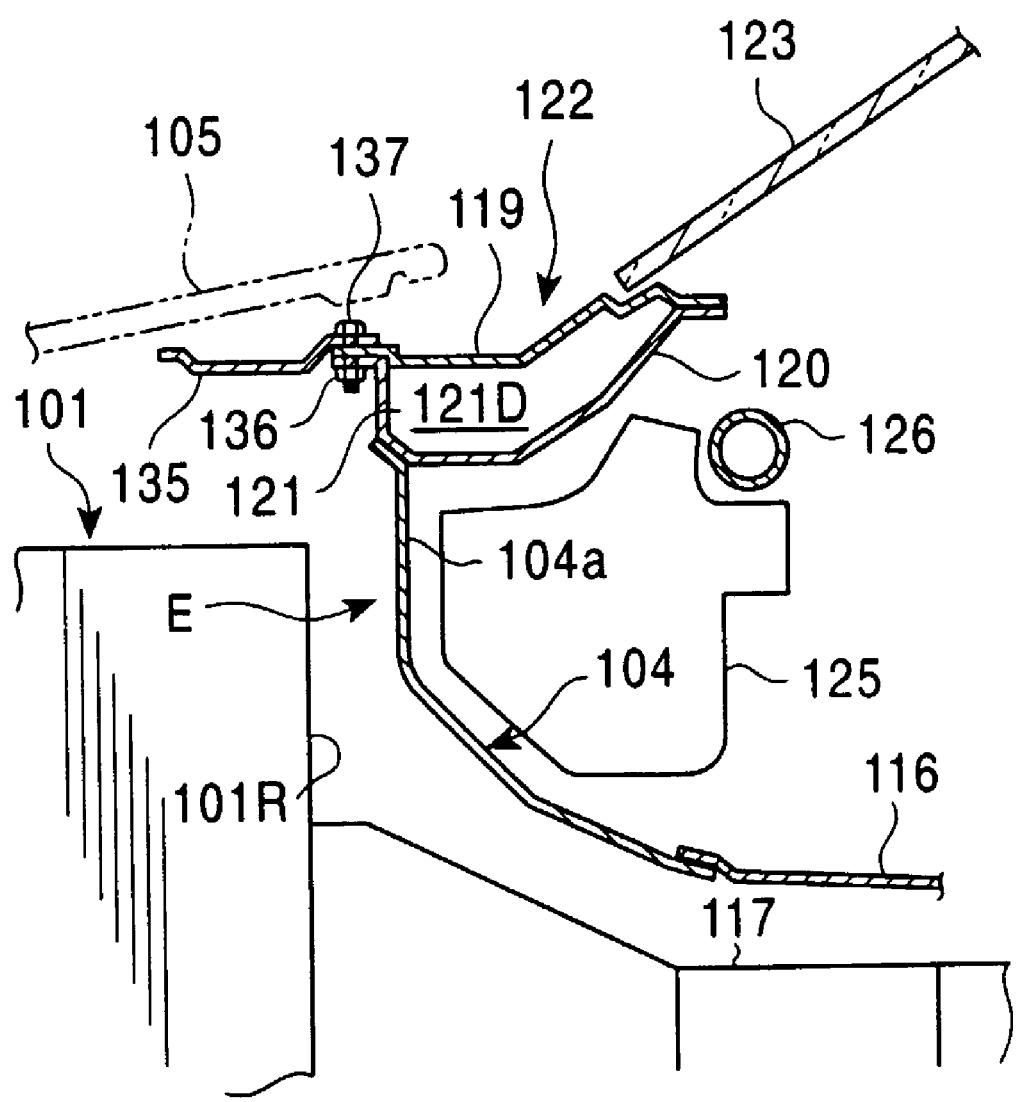
FIG. 12 is a cross-sectional view of XII—XII arrows line in FIG. 9.
Figure 13:
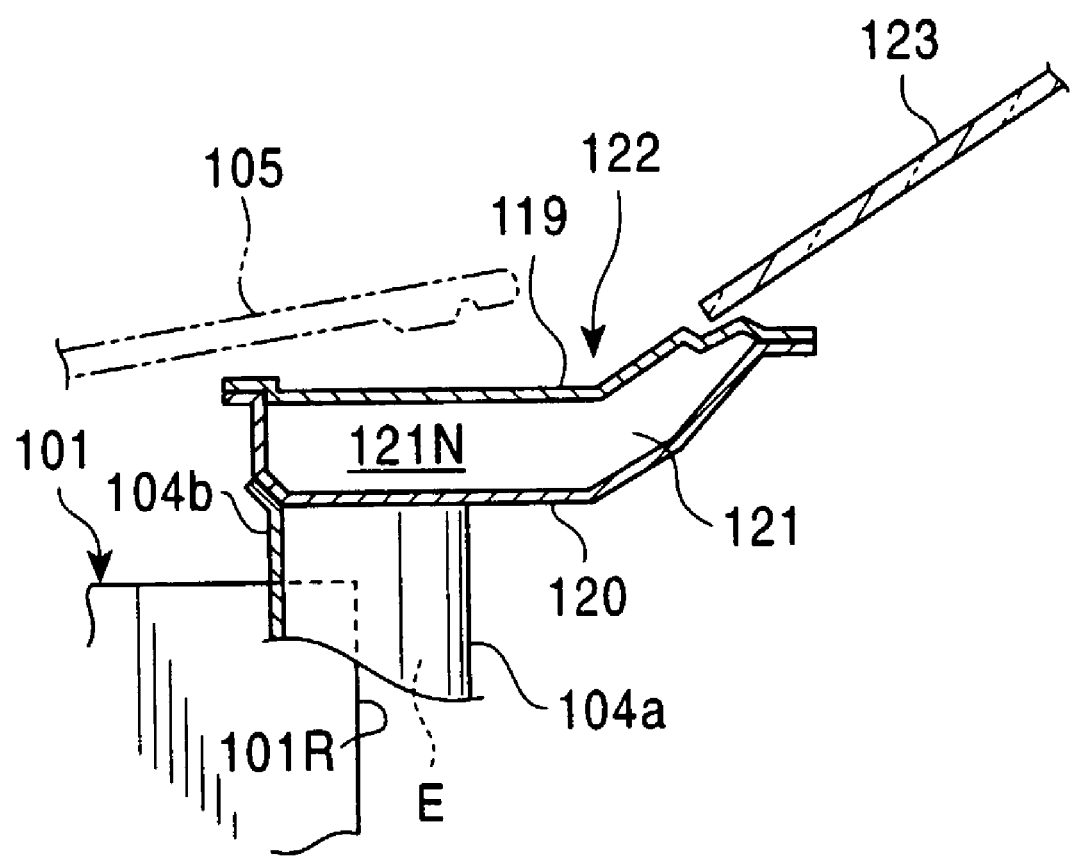
FIG. 13 is a cross-sectional view of XIII—XIII arrows line in FIG. 9.

FIG. 10 is a decomposed perspective view showing an essential part of FIG. 9; FIG. 11 is a cross-sectional view of XI—XI arrows line in FIG. 9; FIG. 12 is a cross-sectional view of XII—XII arrows line in FIG. 9; and FIG. 13 is a cross-sectional view of XIII—XIII arrows line in FIG. 9. Referring to FIG. 10, rearwardly recessed parts 119*a* and 120*a* are defined at the center part of the widthwise direction of each of cowl upper panel 119 and cowl lower panel 120. A part of the cowl 122 having a reduced closed cross-section 121D is defined at the center part of the widthwise direction where the size of the closed cross-section 121 is rearwardly reduced in the longitudinal direction.

FIGS. 11 and 12 show cross-sectional views of the parts corresponding to center part 104*a* of dash lower panel 104, and FIG. 13 shows cross-sectional view of the part corresponding to general plane 104*b*. The closed 121 cross-section of the cowl shown in FIG. 13 has regular size. On the other hand, in FIGS. 11 and 12, a part of the cowl has a reduced cross-section 121D where the size of the closed cross-section 121 is rearwardly reduced in the longitudinal direction. In addition, this part of the cowl having reduced closed cross-section 121D is defined corresponding to engine positioning space 125. The rear end 101R of the engine 101 is mounted within the part of the cowl having a reduced closed cross-section 121D.

Referring to FIGS. 10, 11 and 12, reinforcement panel 135 is provided so that it covers the part of the cowl having reduced closed cross-section 121D, as a means for reinforcing the connection to the part of the cowl having regular closed cross-section 121N.

This reinforcement panel 135 has a cross-sectional structure having recessed shape. At the circumferential flange part 135*a* of the reinforcement panel, four attachment parts 135*b* . . . are formed.

Corresponding to the attachment parts 135*b*, attachment parts 119*b* and attachment parts 120*b* are formed in cowl upper panel 119 and cowl lower panel 120, respectively, in conformity with the cowl having reduced closed cross-section 121D.

Referring to FIG. 12, nut 136 is welded below the attachment part 120*b* of the cowl lower panel 120 beforehand. A bolt 137 is inserted into openings uniformly formed in each of the attachment parts 135*b*, 119*b* and 120*b* to engage with the nut 136. Thus, the reinforcement panel 135 is removably mounted to the cowl 122.

Figure 14:
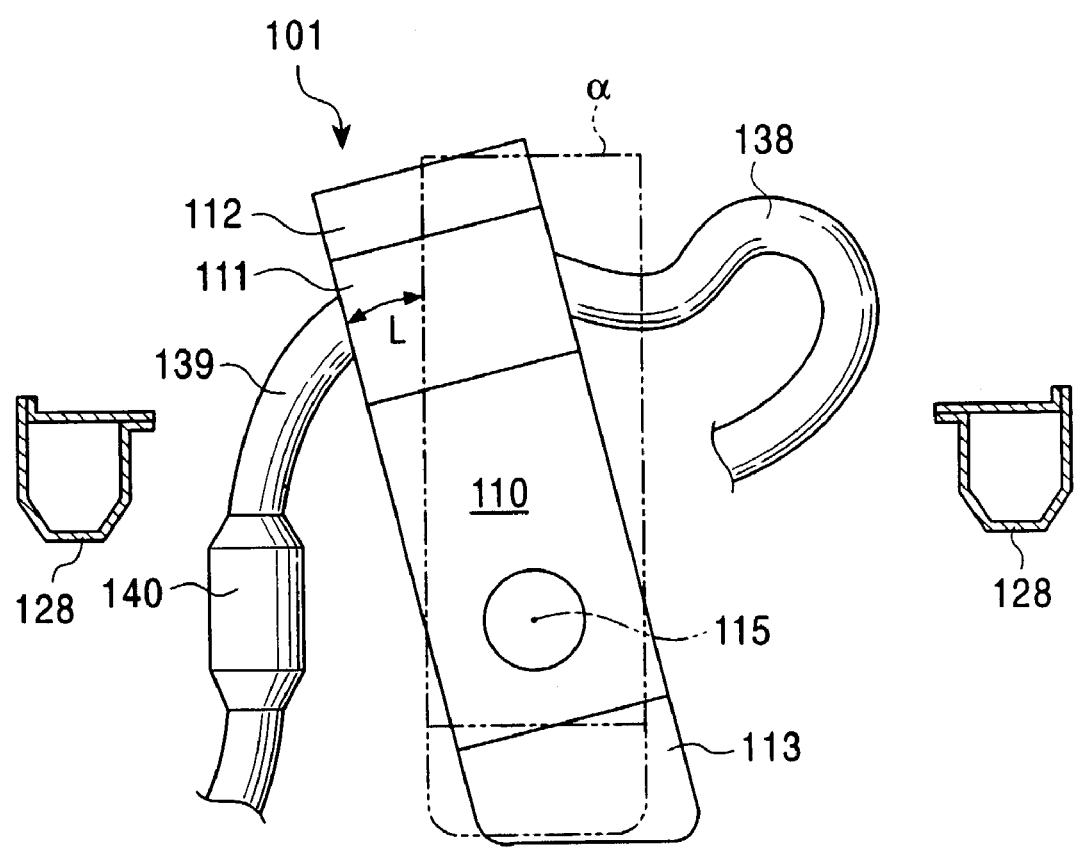
FIG. 14 is a front view showing an essential part of FIG. 7.

With referring to FIG. 14, which is a front view showing an essential part of FIG. 7, a plurality of intake pipes 138 . . . are mounted at the first side of cylinder head 111 in engine 101 and a plurality of exhaust pipes 139 . . . are mounted at the second side thereof. Referring to FIG. 14, engine 101 is mounted at a predetermined angle from a vertical plane so that the intake pipe 138 is positioned higher than the exhaust pipe 139.

Referring to FIG. 14, an engine of upright layout which is not tilted is shown by imaginary line α. As shown by solid line in FIG. 14, by mounting engine 101 at a predetermined angle from a vertical plane so that the intake pipe 138 is positioned higher than the exhaust pipe, since the mount space for intake pipe 138 is enlarged, the flexibility of the layout for intake pipe 138 is improved. On the other hand, at the exhaust pipe side, the space between the opening end of the exhaust port in cylinder head 111 and the upstream end of exhaust pipe 139 is shortened in distance L. In this regard, it is effective to provide catalyst 140 at the downstream of the merging point of a plurality of exhaust pipes 139, because catalyst 140 can be mounted closer to the opening end of the exhaust port in distance L.

Referring to FIG. 8 showing a plan view, intake pipes 138 disposed in the left side of cylinder head 111 have an intake manifold. These intake pipes 138 are mounted so that the distances between the ends connected to the cylinder head 111 of engine 101 of the intake pipes 138 are greater than the distances between the other ends of the intake pipes 138.

Moreover, among the plurality of intake pipes 138, the rearmost intake pipe 138 (the intake pipe which is shown in the right side in FIG. 8, and is on the side close to dash lower panel 104) is mounted such that the intake pipe 138 has one end connected at the engine 101 side and its other end positioned forward of and radially away from the one end.

Similarly, referring to FIG. 8, exhaust pipes 139 disposed in the right (second) side of cylinder head 111 have an exhaust manifold. These exhaust pipes 139 are mounted so that the distances between the ends connected to the cylinder head 111 of engine 101 of the exhaust pipes 139 are greater than the distances between the other ends of the exhaust pipes 139.

Moreover, among the plurality of exhaust pipes 139, the rearmost exhaust pipe 139 (the exhaust pipe which is shown in the right side in FIG. 8, and is on the side close to dash lower panel 104) is mounted such that the exhaust pipe 139 has one end connected at the engine 101 side and its other end positioned forward of and radially away from the one end.

Accordingly, in an engine positioning structure for a rear wheel drive automobile, the automobile having a longitudinal axis and having a passenger compartment 103 with a floor panel and an engine compartment 102 in front of the passenger compartment 103, the two compartments being separated by a dash lower panel 104, with an engine 101 mounted in the engine compartment 102 driving the rear wheels, the engine positioning structure of the embodiment shown in FIGS. 7 to 14 further has: a cowl 122 which is provided at the upper part of the dash lower panel 104, the cowl 122 having a closed cross-section 121 structure extending in a widthwise direction relative to the longitudinal axis; a part of the cowl 122 having a reduced closed cross-section 121D at the center part of the widthwise direction where the size of the closed cross-section is rearwardly reduced in the longitudinal direction; and the rear end 101R of the engine 101 being mounted within the part of the cowl having a reduced closed cross-section 121D.

According to this structure, since the rear end 101R of the engine 101 is mounted within the part of the cowl having a reduced closed cross-section 121D defined at the center part of the widthwise direction, it becomes possible to obtain retreated layout of the engine 101. Namely, a central midengine is obtained by employing the retreated layout of the engine 101 as shown by the solid line in FIG. 7 instead of the conventional engine position as shown by the imaginary line β in FIG. 7. In addition, since it is possible to dispose the engine 101 as a heavy load as close to the center of the automobile as possible, it becomes possible to reduce Yaw moment of inertia. As a result, the steering stability can be improved. In addition, the retreated position of the engine 101 makes it possible to retain a collapsible space in the front part of the automobile.

In addition, the cowl 122 has a reinforcement panel 135 connected to the part of the cowl having a closed cross-section of regular size 121N so that the reinforcement panel 135 covers the part of the cowl having a reduced closed cross-section 121D.

According to this structure, since the reinforcement panel 135 covers the part having a reduced closed cross-section 121D, and the reinforcement panel 135 connects to the part of the cowl having a regular closed cross-section 121N, the rigidity of the cowl 122 is assured by the reinforcement panel 135.

Furthermore, the reinforcement panel 135 is removably mounted to the cowl 122.

According to this structure, since the reinforcement panel 135 is removably mounted to the cowl 122, service or maintenance of the engine 101 or engine accessories becomes easier, especially, when a spark plug needs to be replaced.

Moreover, the engine positioning structure further has: an instrument panel member 126 extending in a widthwise direction; an instrument panel 124 supported by the instrument panel member 126; and an air conditioning unit 125, and the instrument panel member 126 is located so that the instrument panel member overlaps with the position of the air conditioning unit 125.

According to this structure, since the instrument panel member 126 is located so that the instrument panel member overlaps with the position of the air conditioning unit 125, an engine layout in which the engine 101 has more retreated position can be achieved, and a layout of an instrument panel member 126 and that of air conditioning unit 125 can be reconciled. In this embodiment, instrument panel member 126 prevents air conditioning unit 125 from moving rearward at the occasion of head-on collision.

In addition, the dash lower panel 104 is mounted under the cowl 122, and the dash lower panel 104 is recessed in conformance with the part of the cowl having a reduced closed cross-section 121D.

According to this structure, since the dash lower panel 104 is recessed in conformance with the part of the cowl having a reduced closed cross-section 121D, the retreated position of the engine is assured more.

Figure 15:
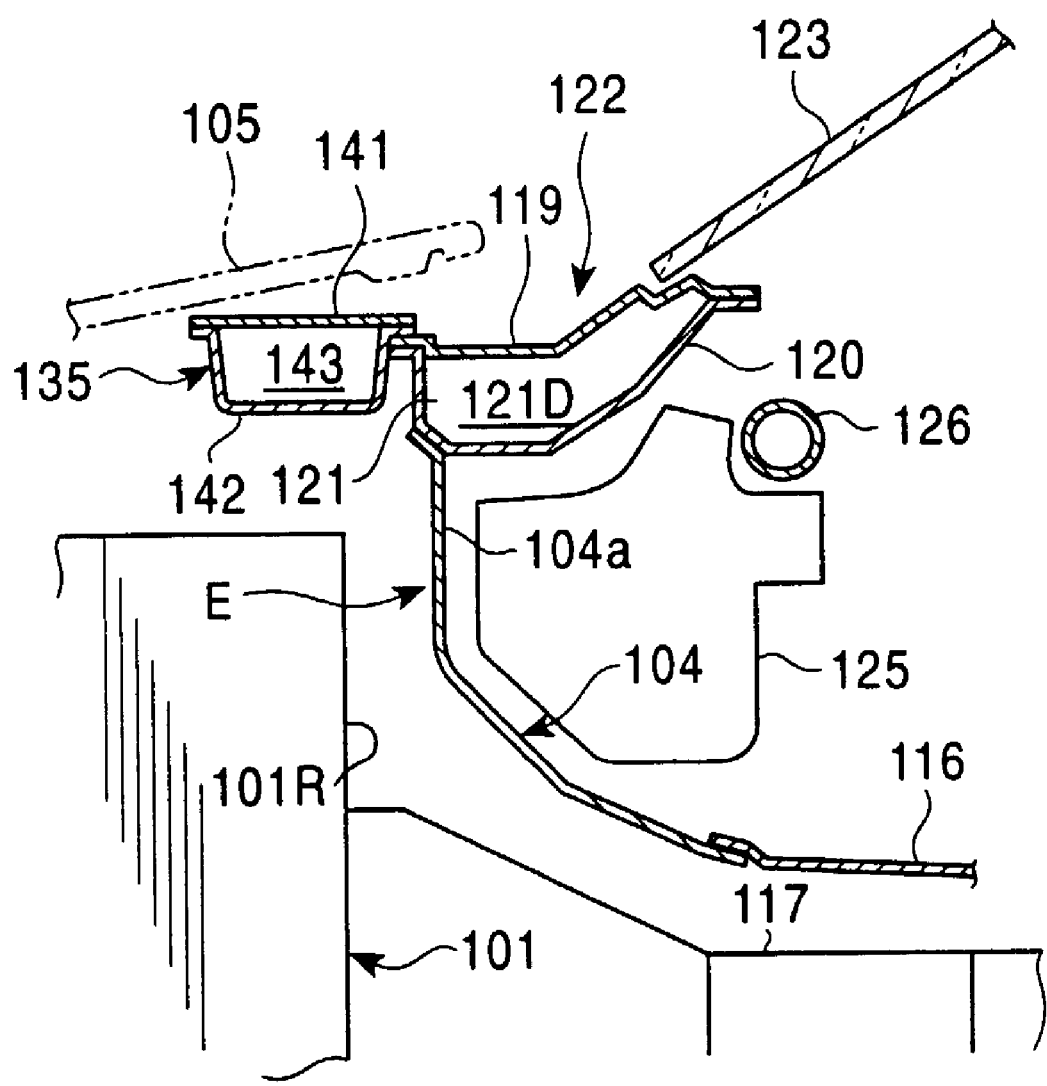
FIG. 15 is a side view showing a reinforcement panel of another embodiment.
Figure 16:
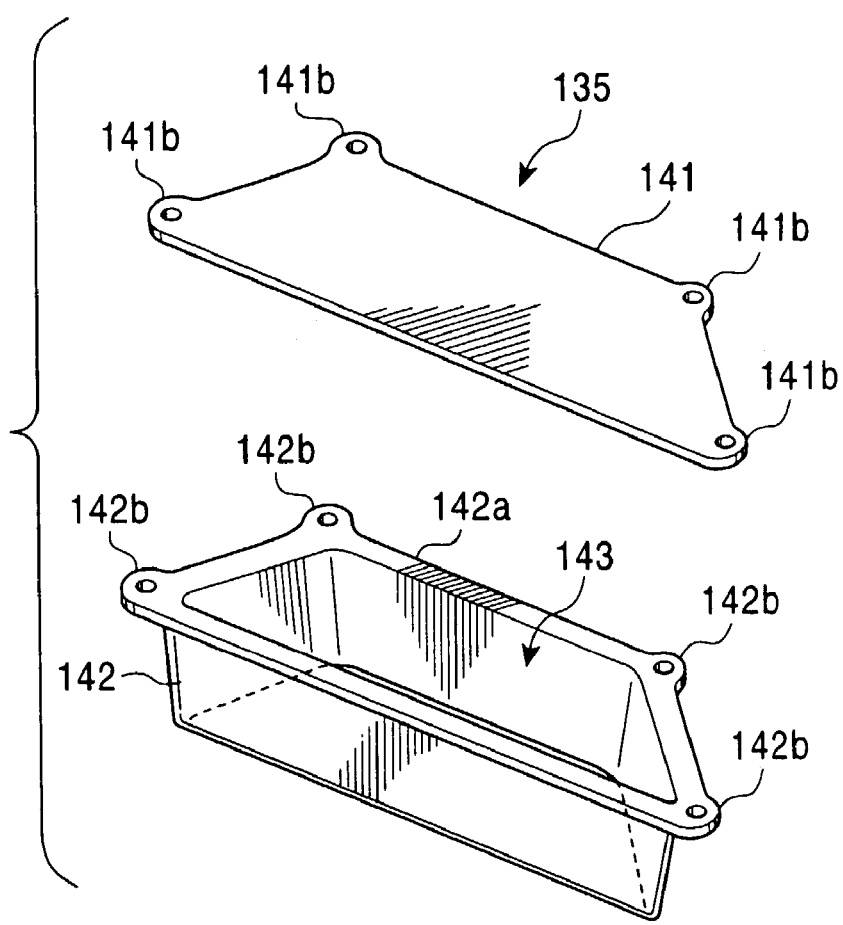
FIG. 16 is a decomposed perspective view showing the reinforcement panel of FIG. 15.

Referring to FIGS. 15 and 16, which show another embodiment of the present invention, the cowl 122 has a reinforcement panel 135 connected to the part of the cowl having a closed cross-section of regular size 121N so that the reinforcement panel 135 covers the part of the cowl having a reduced closed cross-section 121D. The reinforcement panel 135 is formed in the shape of a box having a closed cross-section of the panel 143 by using cover member 141 and box member 142 of a cylindrical shape having a bottom.

In this embodiment, attachment parts 141b are formed at several (for example, four) points on the peripheral part of the cover member 141 corresponding to the attachment parts 119b in cowl upper panel 119 and attachment parts 120b in cowl lower panel 120. In addition, corresponding to the attachment parts 119b, 120b and 141b, four attachment parts 142b are formed at flange part 142a defined at the upper opening of the box member 142.

A bolt 137 (see FIG. 12) is inserted into openings uniformly formed in each of the attachment parts 141b, 142b, 119b and 120b to engage with the nut 136 (see FIG. 12). Thus, the reinforcement panel 135 is removably mounted to the cowl 122.

Accordingly, in the embodiment shown in FIGS. 15 and 16, the reinforcement panel 135 is formed in the shape of a box having a closed cross-section of the panel 143.

According to this structure, since the reinforcement panel 135 is formed in the shape of a box having a closed cross-section of the panel 143, the rigidity of the cowl can be improved.

For this embodiment, almost the same structures, operations and advantages as those for the previous embodiment are achieved. Thus, the same reference numbers used in the previous drawings are used in FIGS. 15 and 16 for referring to the same elements, and detailed explanation is omitted.

Figure 17:
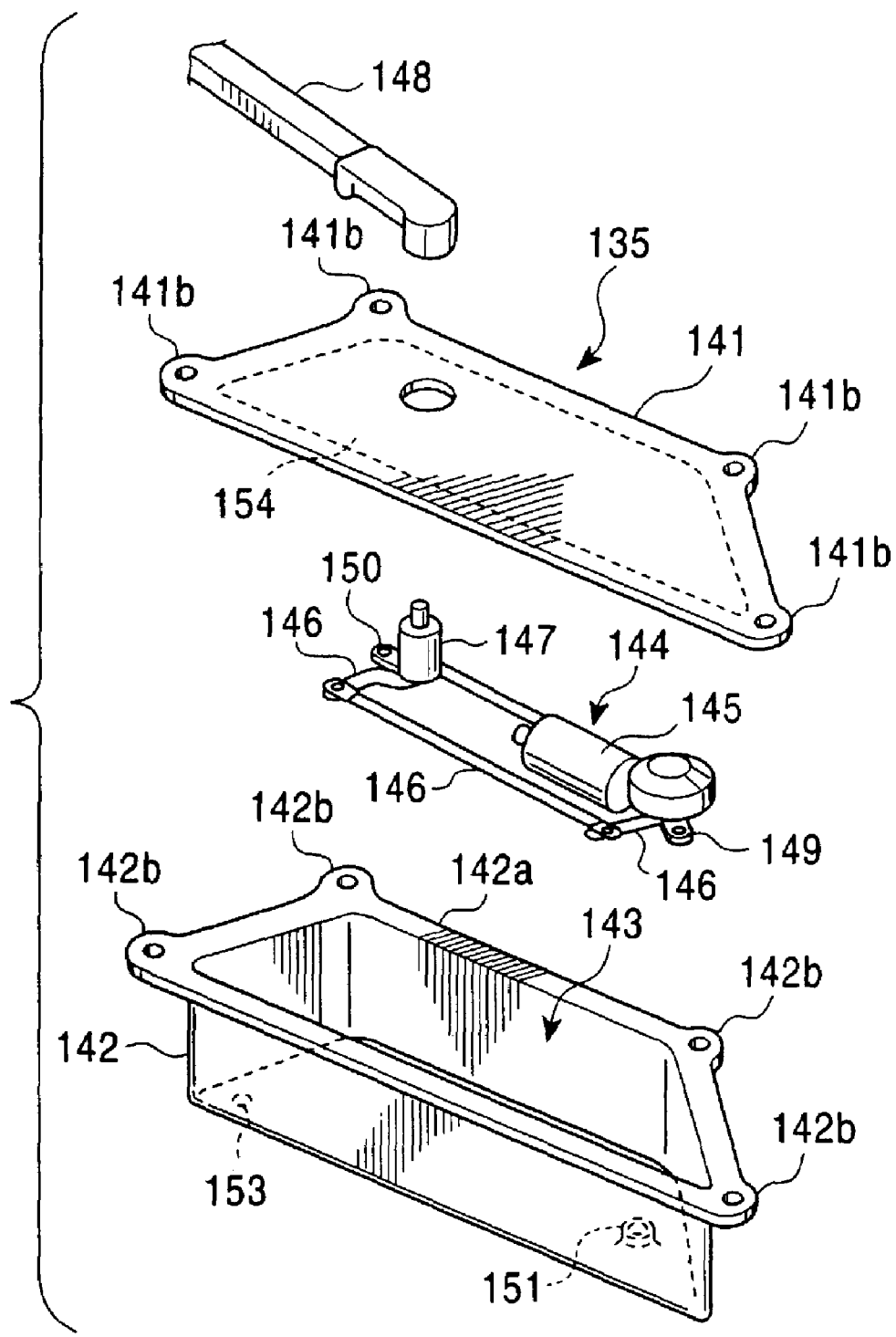
FIG. 17 is a decomposed perspective view showing the structure of a wiper module attached to a reinforcement panel.

Referring to FIG. 17 showing another embodiment of the present invention, the engine positioning structure shown in FIGS. 15 and 16 further has wiper module 144 is attached inside the closed cross-section of the panel 143.

The wiper module 144 has wiper motor 145 and a plurality of links 146 and wiper pivot 147, and drives wiper arm 148.

Attachment members 149 and 150 are defined at each of both wiper motor 145 side and wiper pivot 147 side. Attachment member 149 is fixed to attachment seat 151 defined at the bottom of inside of box member 142 by attaching means such as a bolt. The attachment member 150 is attached to the cover member 141 by way of an article such as a spacer.

In addition, cover member 141 has an opening 152, which leads wiper pivot 147 to upper direction. The bottom of box member 142 has a drain hole 153.

Furthermore, the cover member 141 has a brittle part 154 formed by employing such as a circular and discontinuous slit, at the interior of the position corresponding to the circumference of the upper opening of the box member 142. When a predetermined or more load applies to the brittle part 154 from above, the brittle part 154 fractures, and the inner part of the cover member 141 surrounded by the brittle part 154 is disengaged and dropped from the cowl part 122.

Accordingly, in the embodiment shown in FIG. 17, a wiper module 144 is mounted on the reinforcement panel 135.

According to this structure, the wiper module 144 can be attached by using the reinforcement panel 135 effectively.

In addition, the reinforcement panel 135 and/or the wiper module 144 (in this example, both the part of the cover member 141, which constitutes the reinforcement panel 135, surrounded by the brittle part 154, and the wiper module 144) are mounted on the cowl 122 such that the reinforcement panel 135 and/or the wiper module 144 are disengaged and dropped from the cowl 122 when a predetermined or more load applies thereto from above the cowl 122.

According to this structure, safety of pedestrians can be facilitated. Specifically, when an automobile collides with a pedestrian, and the pedestrian tumbles on a hood 105 of the automobile, since at least one of the reinforcement panel 135 and the wiper module 144 is disengaged and dropped from the cowl 122 by the load caused by the tumble of the pedestrian, the load applied by the wiper module 144, especially by a wiper pivot 147 thereof, to the pedestrian is reduced, and thus the safety of pedestrians can be facilitated.

For this embodiment, almost the same structures, operations and advantages as those for the previous embodiment are achieved. Thus, the same reference numbers used in the previous drawings are used in FIG. 17 for referring to the same elements, and detailed explanation is omitted.

Figure 18:
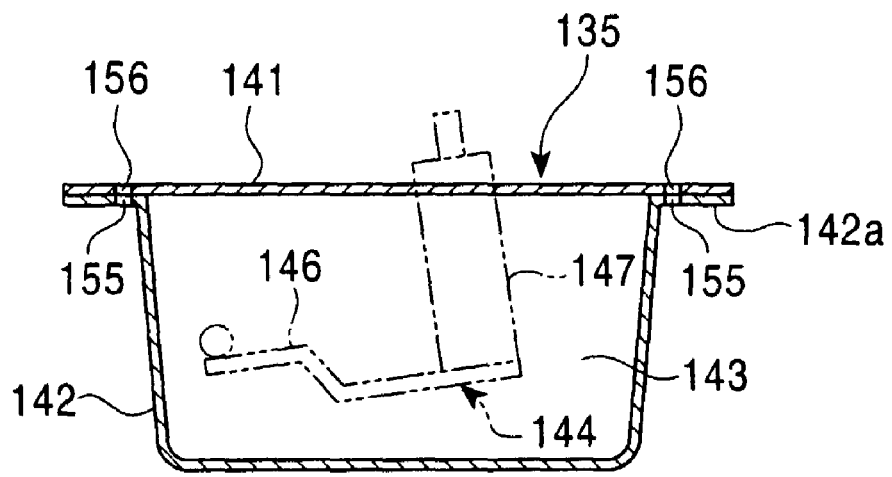
FIG. 18 is a cross-sectional view showing a brittle part of another embodiment.

FIGS. 18 to 21 show other embodiments of the brittle part. Referring to FIG. 18, box member 142 has a circular and discontinuous slit (brittle part) 155 at the flange part 142a close to the circumference of the upper opening of the box member. The cover member 141 also has a circular and discontinuous slit (brittle part) 156 corresponding to the slit 155. When a predetermined or more load applies to them from above the cowl, most of the part of the reinforcement panel 135 and the wiper module 144 are dropped.

Figure 19:
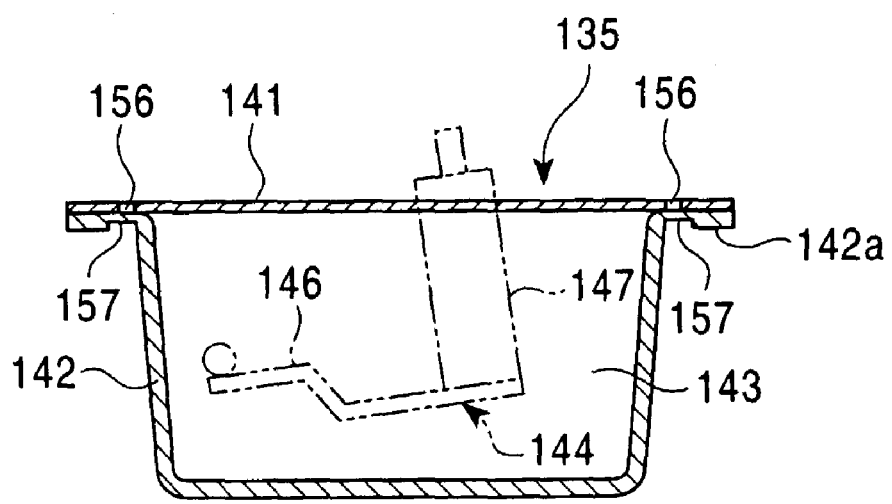
FIG. 19 is a cross-sectional view showing a brittle part of another embodiment.

Referring to FIG. 19, the cover member 141 has a circular and discontinuous slit (brittle part) 156 at the part close to the circumference of the upper opening of the box member 142. The box member 142 has a circular or almost circular thinner part (brittle part) 157 at the flange part 142a corresponding to the slit 156. When a predetermined or more load applies to them from above the cowl, most of the part of the reinforcement panel 135 and the wiper module 144 are dropped.

Figure 20:
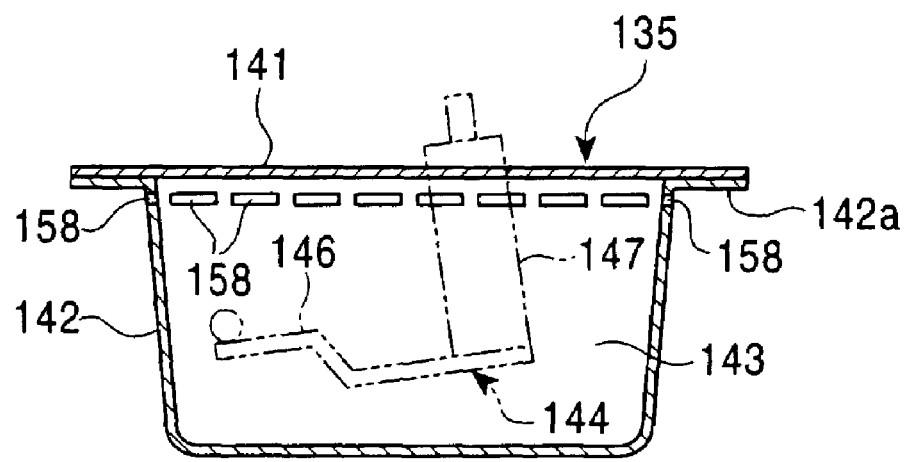
FIG. 20 is a cross-sectional view showing a brittle part of another embodiment.

Referring to FIG. 20, the box member 142 has a circular and discontinuous slit (brittle part) 158 on the peripheral wall (standing wall) at the position close to the circumference of the upper opening of the box member 142. When a predetermined or more load applies to them from above the cowl, the box member 142 and the wiper module 144 are dropped. In the embodiment shown in FIG. 20, both of the attachment members 149 and 150 shown in FIG. 17 are fixed to the inside bottom of the box member 142.

Figure 21:
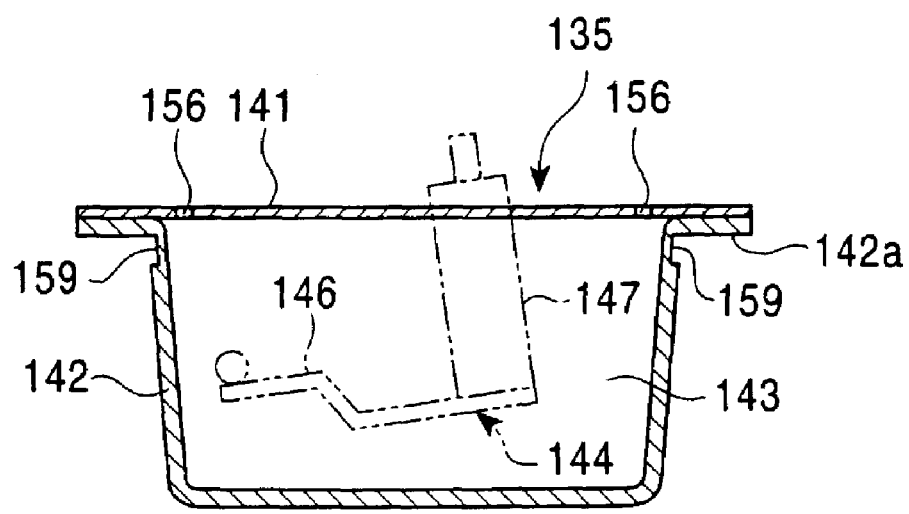
FIG. 21 is a cross-sectional view showing a brittle part of another embodiment.

Referring to FIG. 21, the cover member 141 has a circular and discontinuous slit (brittle part) 156 at the interior of the position corresponding to the circumference of the upper opening of the box member 142. The box member 142 has a circular or almost circular thinner part (brittle part) 159 on the peripheral wall (standing wall) at the position close to the circumference of the upper opening of the box member 142. When a predetermined or more load applies to them from above the cowl, most of the part of the reinforcement panel 135 and the wiper module 144 are dropped.

For this embodiment, almost the same structures, operations and advantages as those for the previous embodiment are achieved. Thus, the same reference numbers used in the previous drawings are used in FIGS. 18 to 21 for referring to the same elements, and detailed explanation is omitted.

Figure 22:
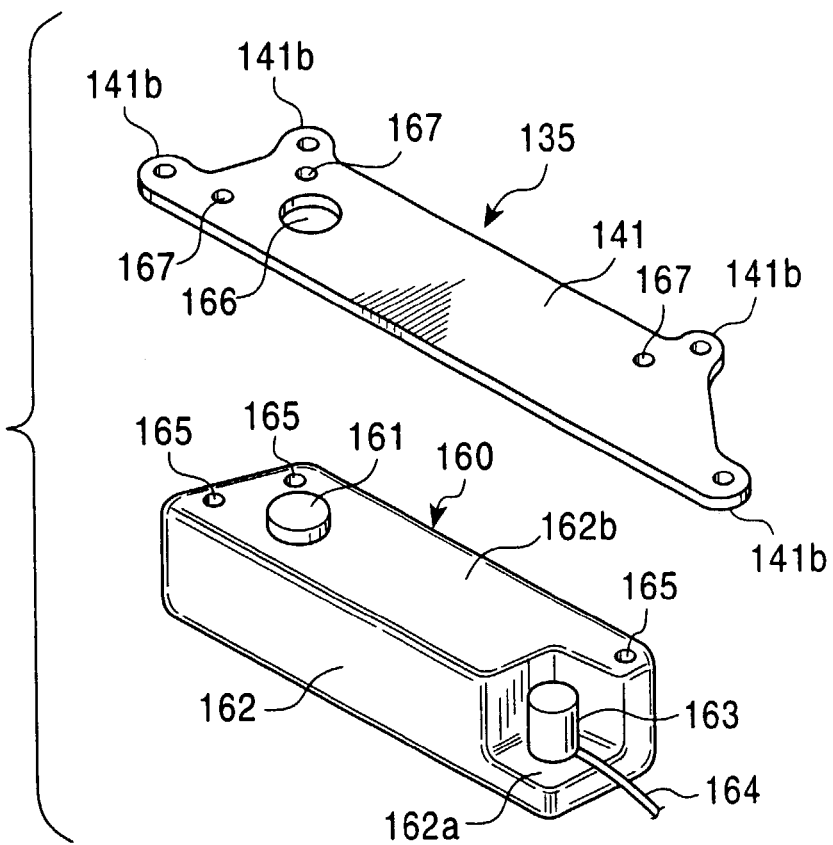
FIG. 22 is a decomposed perspective view showing the structure of a washer tank attached to a reinforcement panel.

FIG. 22 shows another embodiment of the engine positioning structure of the present invention. In this embodiment, the engine positioning structure further has a washer tank 160 mounted on the cover member 141 as a reinforcement panel 135, which covers the part of the cowl having a reduced closed cross-section 121D and connects to the part of the cowl having a regular closed cross-section 121N.

The washer tank 160 is assembled from a tank 162 having a washer liquid inlet 161, a pump 163 attached to a recessed part 162a of the tank body 162, and a washer pipe or washer hose 164 connected to the outlet of the pump 163. A top deck surface 162b of the tank body 162 has a plurality of bolt insert holes 165, which communicate with nuts (not shown) bound or molded by insert molding on the under surface of the top deck.

The cover member 141 has a loophole 166 for the washer liquid inlet 161 and bolt insert holes 167 corresponding to the bolt insert holes 165. Thus, the washer tank 160 is mounted removably under the cover member 141 by using an attachment member such as a bolt.

Accordingly, the engine positioning structure shown in FIG. 22 further has a washer tank 160 mounted on the reinforcement panel 135.

In this regard, the washer tank 160 is a means for reserving a detergent (washer liquid) which is sprayed to a front shield glass 123 when the front view needs to be assured.

According to this structure, by using the reinforcement panel 135 effectively, a washer tank 160 can be mounted on a dead space, and a layout which serves for the pass of the detergent (washer liquid) is achieved.

For this embodiment, almost the same structures, operations and advantages as those for the previous embodiment are achieved. Thus, the same reference numbers used in the previous drawings are used in FIG. 22 for referring to the same elements, and detailed explanation is omitted.

Figure 23:
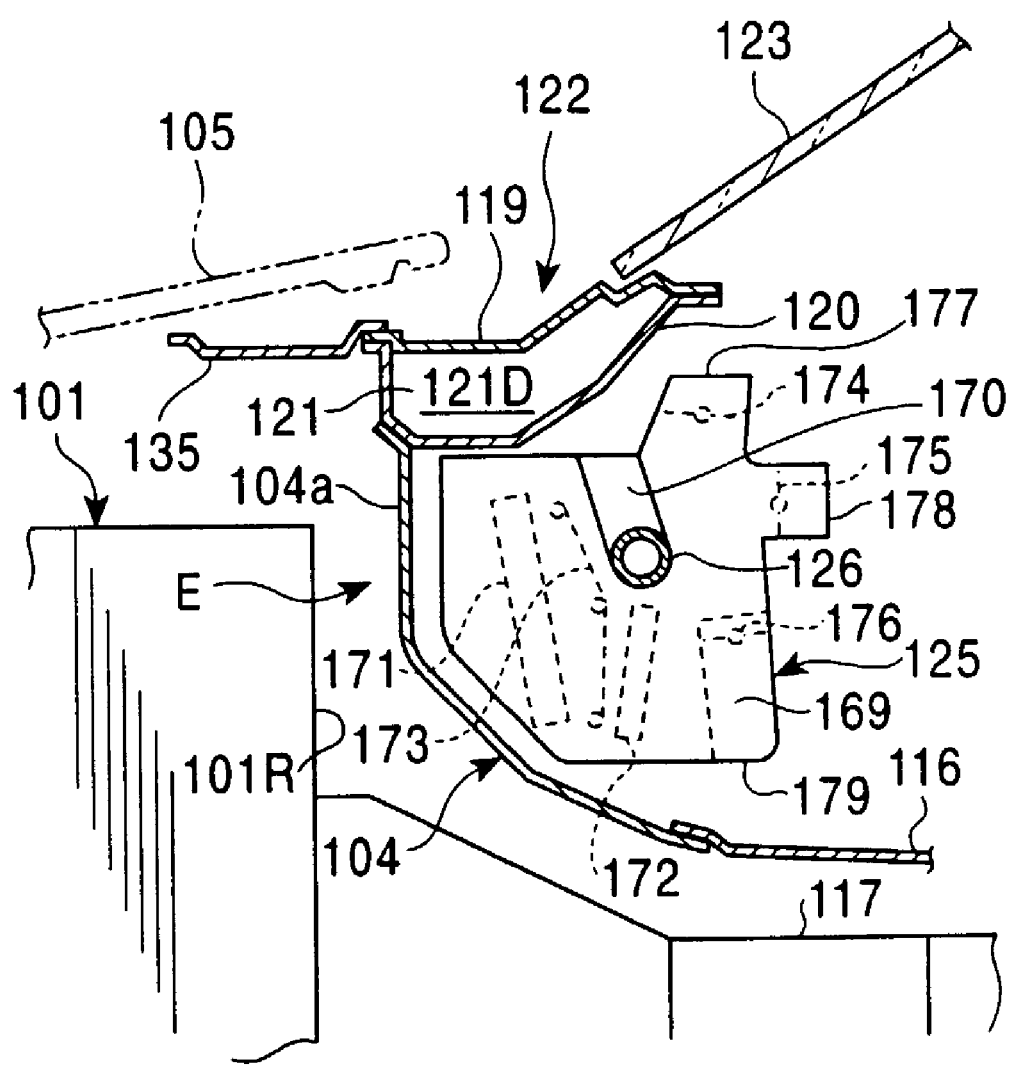
FIG. 23 is a side view showing an engine positioning structure for an automobile of another embodiment of the present invention.
Figure 24:
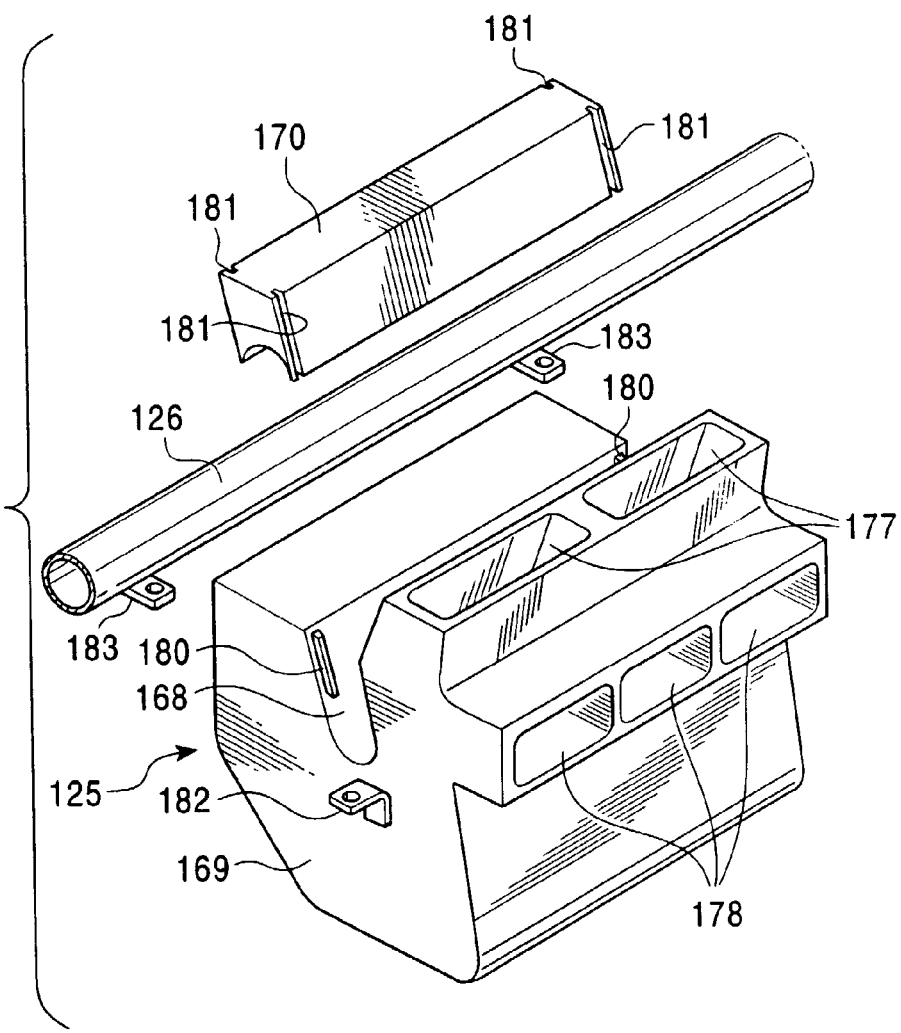
FIG. 24 is a decomposed perspective view showing an essential part of FIG. 23.

FIGS. 23 and 24 show another embodiment of the engine positioning structure of the present invention. In this embodiment, the instrument panel member 126 is located so that it overlaps with the position of the air conditioning unit 125, and the instrument panel member 126 is located within the air conditioning unit 125.

The air conditioning unit 125 has two separated cases: main case 169 and sub case 170. The main case 169 has a recessed part 168 to which the instrument panel member 126 can be mounted. The sub case 170 is disposed to the recessed part 168 to support the instrument panel member 126. The main case 169 has evaporator 171, heater core 172, air mixture door 73, defroster door 174, bent door 175, heat door 176, defroster communication opening 177, bent communication opening 178, and heat nozzle 179.

The recessed part 168 has a plurality of guide rails (guide means) 180. Sub case 170 has a plurality of guide grooves 181. The sub case 170 is positioned to the main case 169 by adjusting the guide grooves 181 to the guide rails 180. Thus, the instrument panel member 126 is disposed between the main case 169 and the sub case 170.

Furthermore, the main case 169 has attachment brackets 182 at both left and right sides. The instrument panel member has attachment brackets 183 corresponding to the attachment brackets 182. As shown in FIG. 23, the air conditioning unit 125 is mounted to the instrument panel member 126 by fastening both of the brackets 182 and 183 by using a fastening means such as bolt and nut.

In this connection, to the instrument panel member 126, the main case 169 is mounted first, then the sub case 170 is mounted.

Accordingly, in the embodiment shown in FIGS. 23 and 24, the engine positioning structure further has: an instrument panel member 126 extending in a widthwise direction; an instrument panel 124 supported by the instrument panel member 126; and an air conditioning unit 125, the instrument panel member 126 and the air conditioning unit 125 are located in the rear of the cowl, and the instrument panel member 126 is located so that the instrument panel member overlaps with the position of the air conditioning unit 125.

According to this structure, since the instrument panel member 126 is located so that it overlaps with the position of the air conditioning unit 125, an engine layout in which the engine 101 has more retreated position can be achieved, and a layout of an instrument panel member 126 and that of air conditioning unit 125 can be reconciled. In addition, the nozzle of the air conditioning unit 125 can be disposed at an appropriate position.

Furthermore, instrument panel member 126 prevents air conditioning unit 125 from moving rearward at the occasion of head-on collision.

For this embodiment, almost the same structures, operations and advantages as those for the previous embodiment are achieved. Thus, the same reference numbers used in the previous drawings are used in FIGS. 23 and 24 for referring to the same elements, and detailed explanation is omitted.

Figure 25:
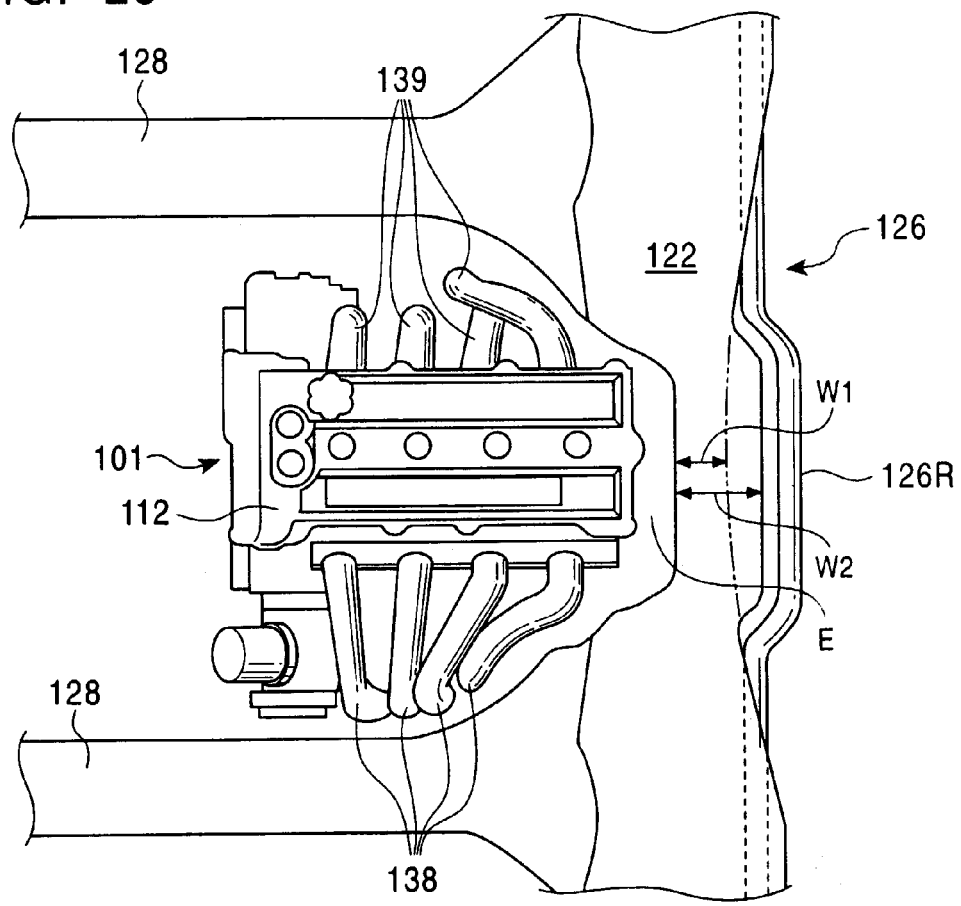
FIG. 25 is a side view showing an engine positioning structure for an automobile of another embodiment of the present invention.
Figure 26:
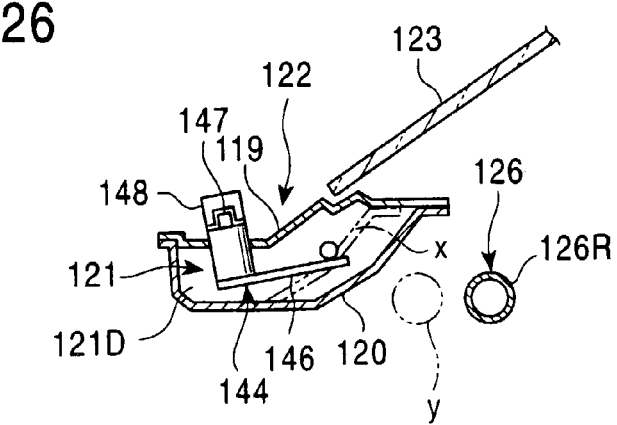
FIG. 26 is a decomposed perspective view showing an essential part of FIG. 25.

FIGS. 25 and 26 show another embodiment of the engine positioning structure of the present invention. In this embodiment, the instrument panel member 126 is located rearwardly of the position corresponding to the part of the cowl that has a reduced closed cross-section 121D and in conformance with the part of the cowl that has a reduced closed cross-section 121D, a recessed part 126R of the instrument panel member 126 is defined at a center part in the widthwise direction, and the recessed part 126R extends rearwardly relative to both sides of the instrument panel member 126.

In addition, the part of the cowl having a reduced closed cross-section 121D is enlarged rearwardly.

Accordingly, in the embodiment shown in FIGS. 25 and 26, the engine positioning structure further comprises: an instrument panel member 126 extending in a widthwise direction; and an instrument panel 124 supported by the instrument panel member 126, the instrument panel member 126 connects to the panels at both sides of an automobile (see hinge pillars), and the instrument panel member 126 being located rearwardly of the position corresponding to the part of the cowl that has a reduced closed cross-section 121D and in conformance with the part of the cowl that has a reduced closed cross-section 121D.

According to this structure, since the instrument panel member 126 is located rearwardly and in conformance with the shape of the cowl 122, the part having a reduced closed cross-section 121D can be enlarged to some extent corresponding to the curve of the instrument panel member 126. As a result, the rigidity of the cowl 122, which contributes to the rigidity of an automobile body, is assured, and thus the rigidity of the automobile body is improved. Referring to FIG. 25, when the instrument panel member 126 is not located rearwardly, only the layout space for the wiper W1 represented by the arrow is available. In this case, referring to the imaginary lines x and y shown in FIG. 26, when the wiper module 144 is tried to be mounted within the closed cross-section of the cowl 121, the wiper module 144 interferes with the cowl lower panel 120. On the other hand, in this embodiment, the recessed part 126R is defined in the instrument panel member 126, and thus the part of the cowl having a reduced closed cross-section 121D is enlarged rearwardly. As a result, as represented by the arrow in FIG. 25, since an enlarged layout space W2 for the wiper module is available, the wiper module 144 can be mounted to the part of the cowl having a reduced closed cross-section 121D.

Comparing the elements of the present invention with those in the embodiments described herein, the dash panel corresponds to dash lower panel 104. However, the scope of the present invention is not limited to the above-described embodiments.

According to the present invention, since the rear end of the engine of a FR automobile is mounted within the part of the cowl having a reduced closed cross-section defined at the center part of the widthwise direction, it becomes possible to obtain retreated layout of the engine. In addition, since it is possible to dispose the engine as a heavy load as close to the center of the automobile as possible, it becomes possible to reduce Yaw moment of inertia. As a result, the steering stability can be improved. In addition, the retreated position of the engine makes it possible to retain a collapsible space in the front part of the automobile.

With referring to FIGS. 27 to 38, the third aspect of the present invention will be explained in detail hereinafter.

Figure 27:
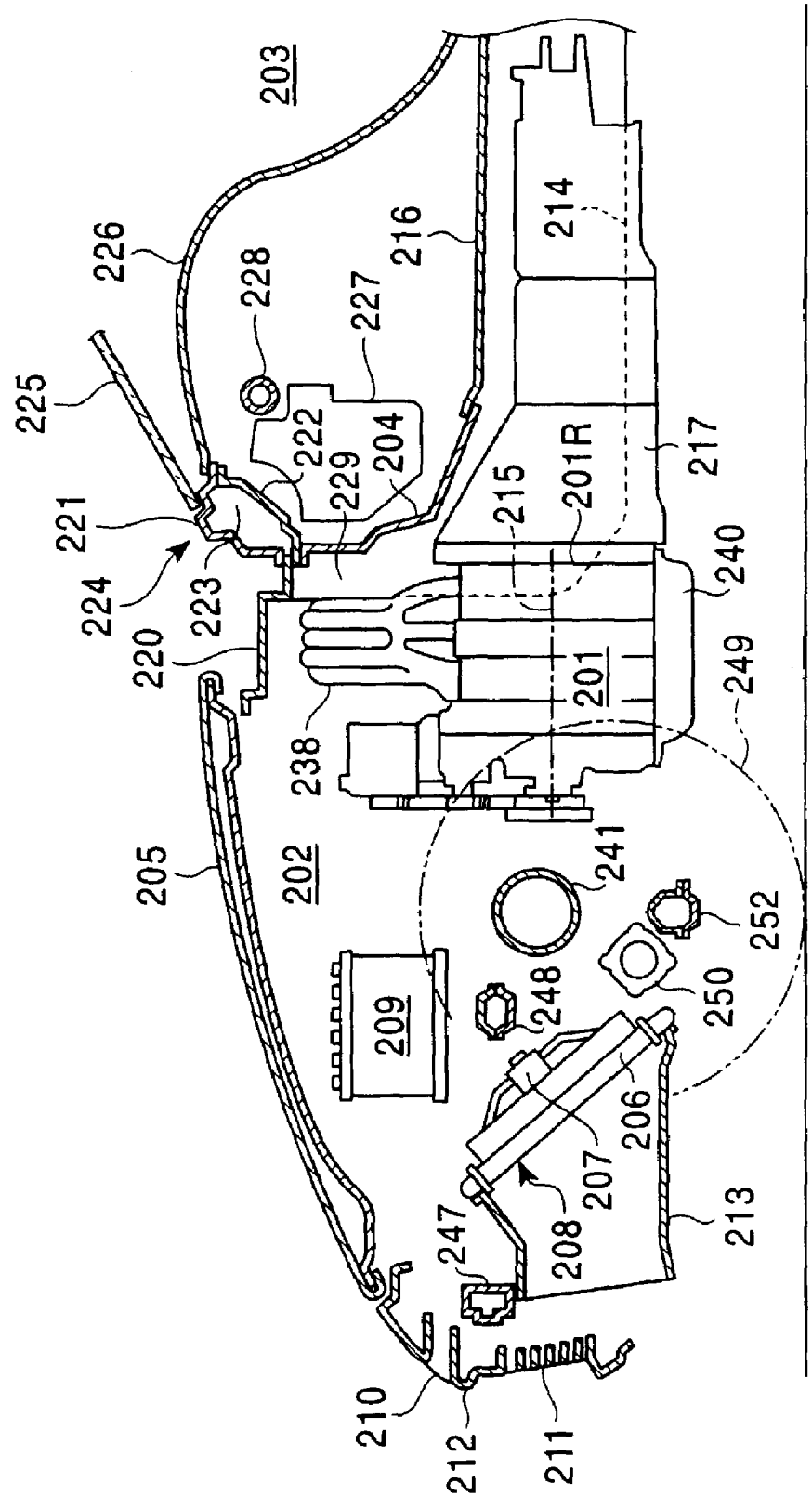
FIG. 27 is a side view showing an engine positioning structure for an automobile of the third embodiment of the present invention.
Figure 28:
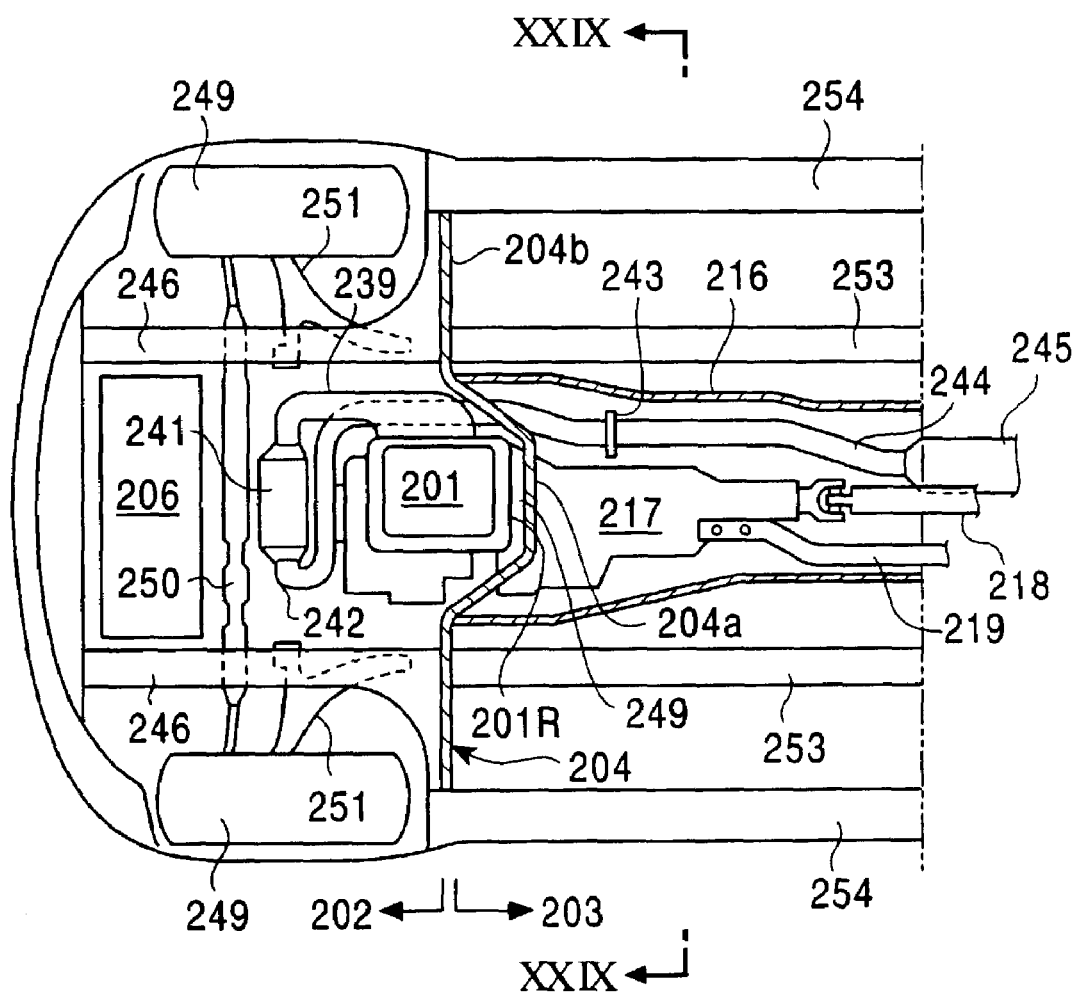
FIG. 28 is a plan view showing an essential part of FIG. 27.

Referring to FIGS. 27 and 28 showing an engine positioning structure for an automobile, engine compartment 202 in which engine 201 is mounted and passenger compartment 203 on which passengers ride are separated as compartments by dash lower panel 204 as partitioning means.

The upper part of engine compartment 202, which is in front of passenger compartment 203 and separated therefrom by dash lower panel 204, is covered by hood 205 which can be opened and closed. In engine compartment 202, in front of engine 201, a cooling unit 208 having a cooling fun 207 and a radiator 206 are all disposed on the tilt such that their front parts are higher than their rear parts. Air cleaner (not shown) is disposed between the cooling unit 208 and engine 201.

At the front part and the lower part of the hood 205, a front grille 212 having openings 210 and 211 for taking running winds is provided. A duct 213 is attached so that the opening 211 communicates with the front surface of the radiator 206.

A floor panel 214, which constitutes a floor of the passenger compartment, is provided at the rear end of dash lower panel 204. In this regard, engine 201 is disposed such that axis core line 215 of an eccentric shaft 235 (see FIG. 30) as an engine rotation axis of the engine is at a position higher than the height of floor panel 214 of passenger compartment 203.

Referring to FIGS. 27, 28 and 29, behind engine 201, transmission 217 is connected so that it is positioned exterior of the automobile relative to tunnel part 216 of floor panel 214. The engine 201 and transmission 217 constitute a power train, and engine 201 drives rear wheels by way of transmission 217, an universal joint, a propeller shaft 218 and a rear differential device.

In this connection, in FIG. 28, 219 represents a power plant frame (so-called "PPF") extending between a transmission case and a differential case along the longitudinal direction of the automobile.

Referring to FIG. 27, above the dash lower panel 204, cowl upper panel 221, cowl lower panel 222 and dash upper panel 220 constitute cowl 224 (a rigid member for an automobile body) extending in the widthwise direction and having a structure of closed cross-section 223. At the upper part of closed cross-section of cowl 223, front shield glass 225 is mounted.

Between dash lower panel 204 and instrument panel 226, air conditioning unit 227 is mounted as close to engine 201 as possible. In addition, an instrument panel member 228 is located so that it overlaps with the position of the air conditioning unit 227.

The instrument panel member 228 extends in the widthwise direction, and connects between the left and right pillars (between the automobile body panels). The instrument panel member 228, which is an automobile body rigid member, supports the instrument panel 226.

With referring to FIG. 28, center part 204a of the widthwise direction of dash lower panel 204 recesses rearwardly relative to both sides of dash lower panel 204, namely, general plane 204b of the position corresponding to the position of a passenger. An engine mount space 229 is defined in front of center part 204a, and rear end part 201R of engine 201 is mounted within this engine mount space 229.

In addition, corresponding to engine mount space 229, a recessed part is formed in center part of cowl 224 which is provided to the upper part of dash lower panel 204.

In this embodiment, a rotary engine is used as the engine 201. As shown in FIGS. 27 and 28, the rotary engine 201 is mounted vertically in the engine compartment 202.

Figure 30:
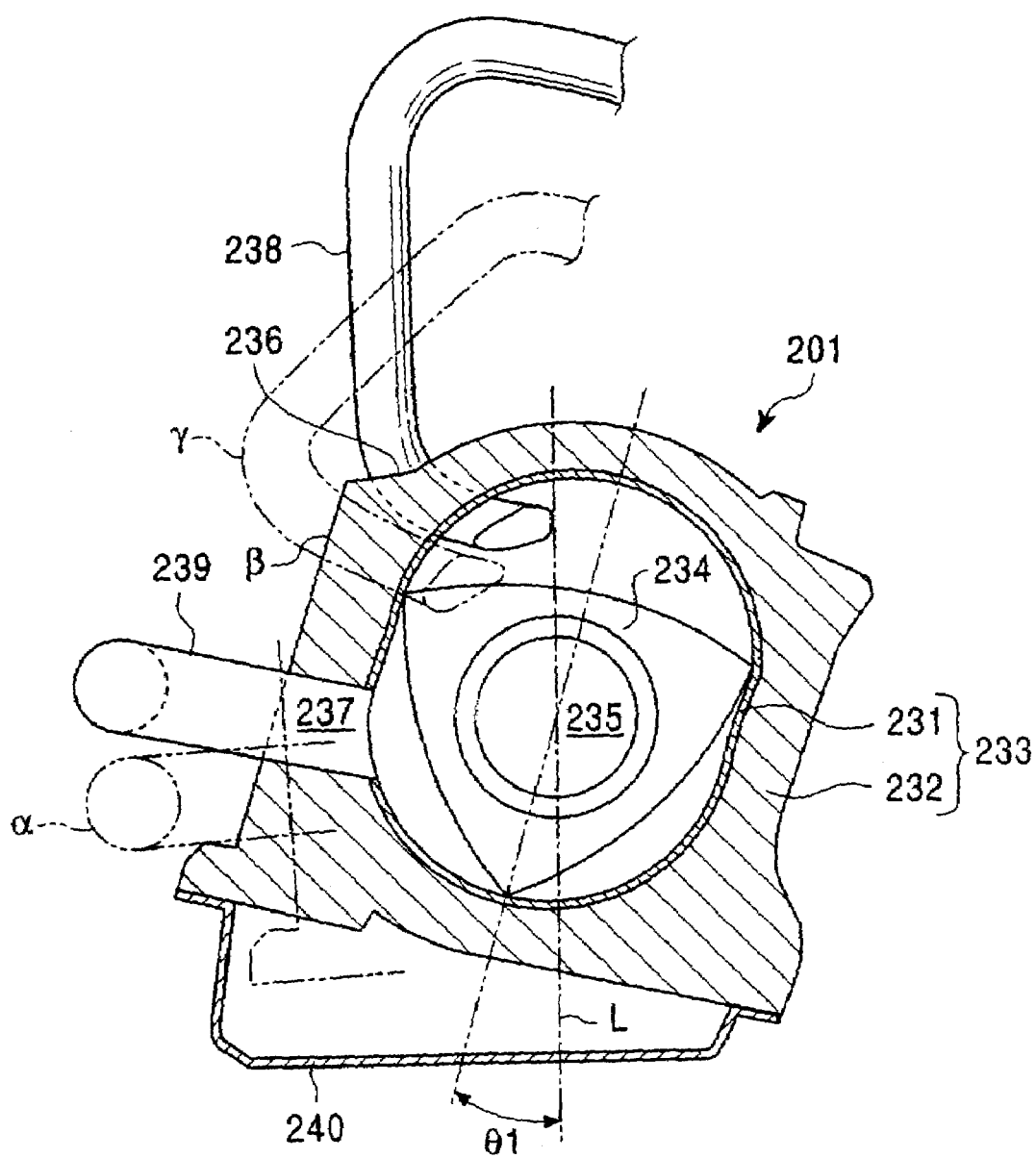
FIG. 30 is a front view showing a slant disposition of the engine.

Referring to FIG. 30, the rotary engine 1 consists of a liner 231 and base material 232, and has a rotor housing 233 forming an operation compartment, a rotor 234 rotating within the liner 231, an eccentric shaft 235 as an engine rotation axis, an intake port 236 and an exhaust port 237 formed in the rotor housing 233, a intake pipe 238 and an exhaust pipe 239 connected to each of these ports, respectively, spark plugs (not shown) at the trailing side and leading sides, and an oil pan.

Referring to FIG. 30, the rotary engine 201 is mounted at an angle relative to a vertical plane that the side of exhaust system containing the exhaust port 237 and the exhaust pipe 239 is higher than it would have been in if the engine was not mounted at the specified angle.

Namely, the engine body is mounted on the slant at an angle θ1 relative to a vertical line L that each of the elements 237 and 239 is higher as shown by the solid line in the figure than the conventional exhaust system shown by the imaginary line α.

In addition, as shown in FIG. 30, the rotary engine 201 is mounted such that the intake port 236 is located at the upper part of the engine 201.

Namely, the engine body is mounted on the slant at an angle θ1 relative to a vertical line L that the intake port 236 is higher as shown by the solid line in the figure than the conventional exhaust system shown by the imaginary line β. Thus, by making the radius of curvature of intake pipe 238 shown by the solid line larger than that of the conventional intake pipe shown by the imaginary line γ, it becomes possible to reduce intake resistance, to improve the flexibility of the layout for the intake system and to make handling of the intake pipe easier.

A catalyst 241 for cleaning an exhaust gas is provided to the exhaust pipe 239 (upstream exhaust pipe) connected to the exhaust port 237 of the rotary engine 201. Referring to FIG. 28, the exhaust pipe 239 is mounted such that it extends in front of the engine and then to the rear of the engine.

Namely, the exhaust pipe 239 first extends in front of the engine 201. Then, the catalyst 241 is attached to the extended end of the exhaust pipe. The catalyst 241 is mounted in front of the engine 201 in a widthwise direction. At the downstream of the catalyst 241, the exhaust pipe 242 at the downstream of the catalyst is attached.

The exhaust pipe 242 at the downstream of the catalyst first extends from the downstream of the catalyst 241 in a widthwise direction. Then, the exhaust pipe bends to reach to the tunnel part 216 through outside of the engine 201. At the downstream end of the exhaust pipe, a downstream exhaust pipe 244 and a downstream catalyst 245 are connected by way of a connection flange 243.

Thus, by mounting the exhaust pipe 239 and the catalyst 241 in front of the engine 201, a retreated layout of the engine 201 is obtained.

Referring to FIGS. 27, 28 and 29 showing the structure of the front part of an automobile body, a pair of left and right front side frame 246, 246 extending in the longitudinal direction are located in the engine compartment 202. A bumper reinforcement 247 extending in the widthwise direction is attached to the front ends of these front side frames 246, 246.

In addition, a front cross member (so-called "No. 1.5 cross member") 248 bridges between the left and right front side frames 246, 246 at the position subject to a load input from the front suspension behind bumper reinforcement 247.

In addition, a power steering 250 is provided to steer front wheels 249. Furthermore, a suspension cross member 252 is provided to support the front suspension containing a lower arm 251.

On the other hand, a floor frame 253 extending in a longitudinal direction is provided under the floor panel 214 so that the floor frame corresponds to the front side frame 246. Side sills 254 are provided at both sides of the floor panel 214.

The side sill 254 has a side sill inner 255 and a side sill outer 256. The side sill is a rigid member for an automobile body having a closed cross-section of the side sill 257 extending in a longitudinal direction. In this connection, each of the elements 246, 247, 248 and 253 is a rigid member for an automobile body. Referring to FIG. 29, 258 represents a front seat.

Accordingly, in an engine positioning structure for a rear wheel drive automobile, the automobile having a longitudinal axis and having a passenger compartment 203 with a floor panel 214 and an engine compartment 202 in front of the passenger compartment 203, the two compartments being separated by a dash lower panel 204, with an engine 201 mounted in the engine compartment 202 driving the rear wheels, the engine positioning structure of the embodiment shown in FIGS. 27 to 30 has: means for positioning the engine 201 so that a rotation axis of the engine (see axis core line 215) is at a position higher than the height of the floor panel 214 of the passenger compartment 203; and exhaust pipes 239, 242 provided in the engine 201, the exhaust pipes 239, 242 being mounted such that they extend in front of the engine 201 and then to the rear of the engine.

According to this structure, since the exhaust pipes 239, 242 are mounted such that they extend in front of the engine 201 and then to the rear of the engine, it becomes possible to obtain retreated layout of the engine 201. In addition, since the Yaw moment of inertia is reduced, the steering stability can be improved. Furthermore, since the protruding part at the tunnel part 216 which was inevitable in the prior art is eliminated, it is possible to retain enough space in the passenger compartment.

In addition, the engine positioning structure further has: a catalyst 241 provided in the exhaust pipes 239, 242, the catalyst 241 being mounted in front of the engine 201 in a widthwise direction.

According to this structure, since a catalyst 241 is provided in the exhaust pipes 239, 242 passing in front of the engine, and the catalyst 241 is mounted in front of the engine 201 in a widthwise direction, the tunnel part 216 does not protrude into the passenger compartment 203. In addition, there is no need to provide an insulator to the tunnel part 216 in order to prevent a harm caused by the heat. Furthermore, since the catalyst 241 is disposed as close to the engine 201 as possible in front of the engine, an appropriate reaction of the catalyst 241 can be achieved.

Furthermore, a cleaning unit 208 is mounted in front of the catalyst 241.

According to the structure, a layout of the catalyst 241 and that of the cooling unit 208 can be reconciled in the engine compartment 202. In addition, it is possible to cool the catalyst 241 by using the cooling unit 208.

Moreover, the engine positioning structure further has: an engine mount space 229 formed at the center part 204*a* of the widthwise direction of the dash lower panel 204 and recessed in relation to both sides of the dash lower panel in a rearward direction; and the rear end 201R of the engine 201 is mounted within the recessed engine mount space.

According to this structure, since the rear end 201R of the engine is mounted within the recessed engine mount space 229, the retreated position of the engine 201 is assured more.

In addition, the engine 201 is mounted at an angle relative to a vertical plane that the side of exhaust system (see exhaust port 237 and exhaust pipe 239) is higher than it would have been in if the engine was not mounted at the specified angle.

According to this structure, since the slant direction of the engine 201 is determined as described above, the flexibility of the layout for the exhaust system is improved Furthermore, the intake port 236 of the engine 201 is located at the upper part of the engine.

According to this structure, since the intake port 236 is located at the upper part of the engine, the flexibility of the layout for the intake system is improved. In addition, it becomes easier to handle the intake pipe 238.

Moreover, the engine 201 is a rotary engine mounted vertically.

According to this structure, since the engine 201 is a rotary engine mounted vertically in the engine compartment 202, each of above-described advantages of the present invention becomes more significant.

Figure 31:
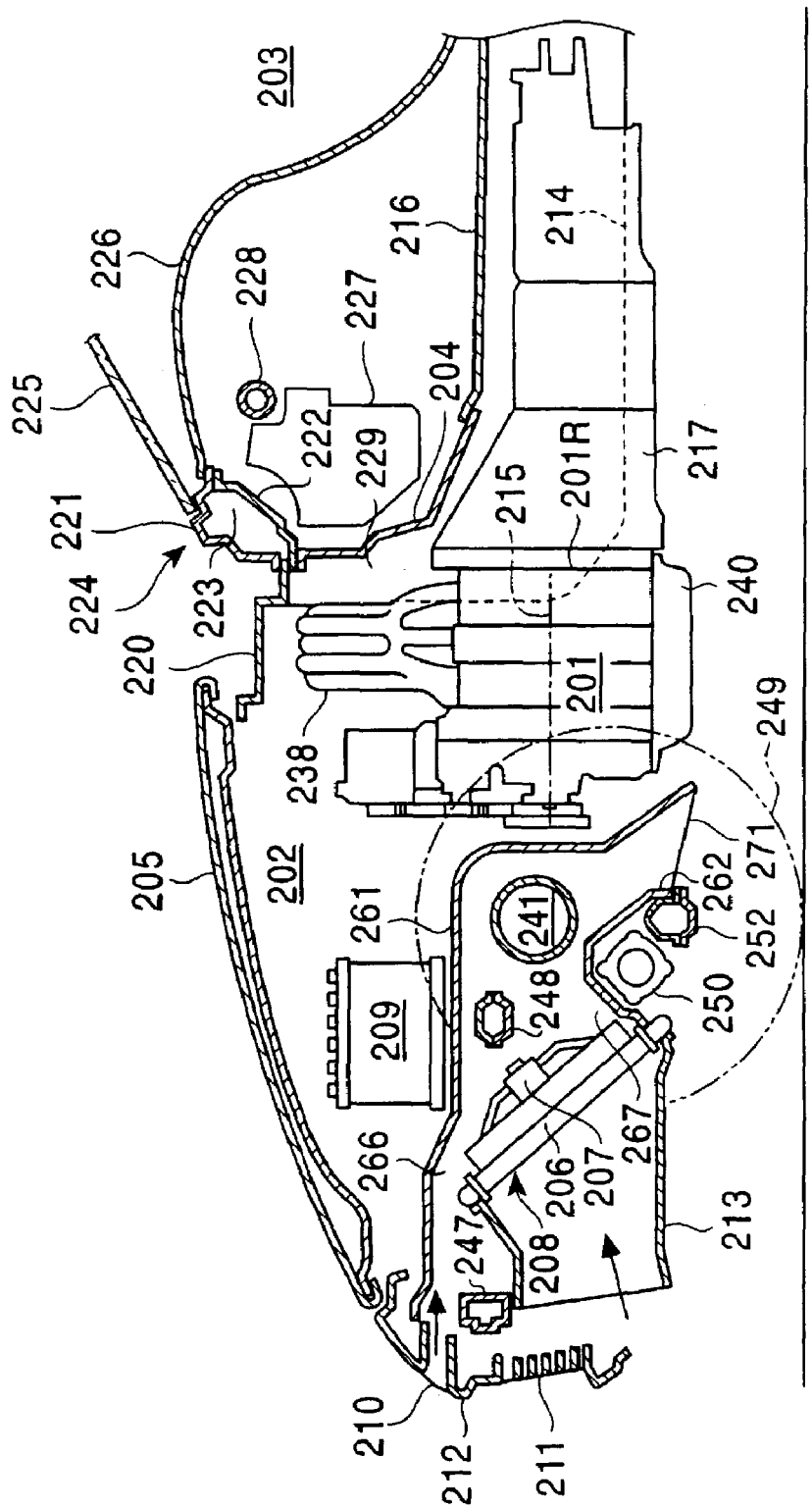
FIG. 31 is a side view showing an engine positioning structure for an automobile of another embodiment of the present invention.
Figure 32:
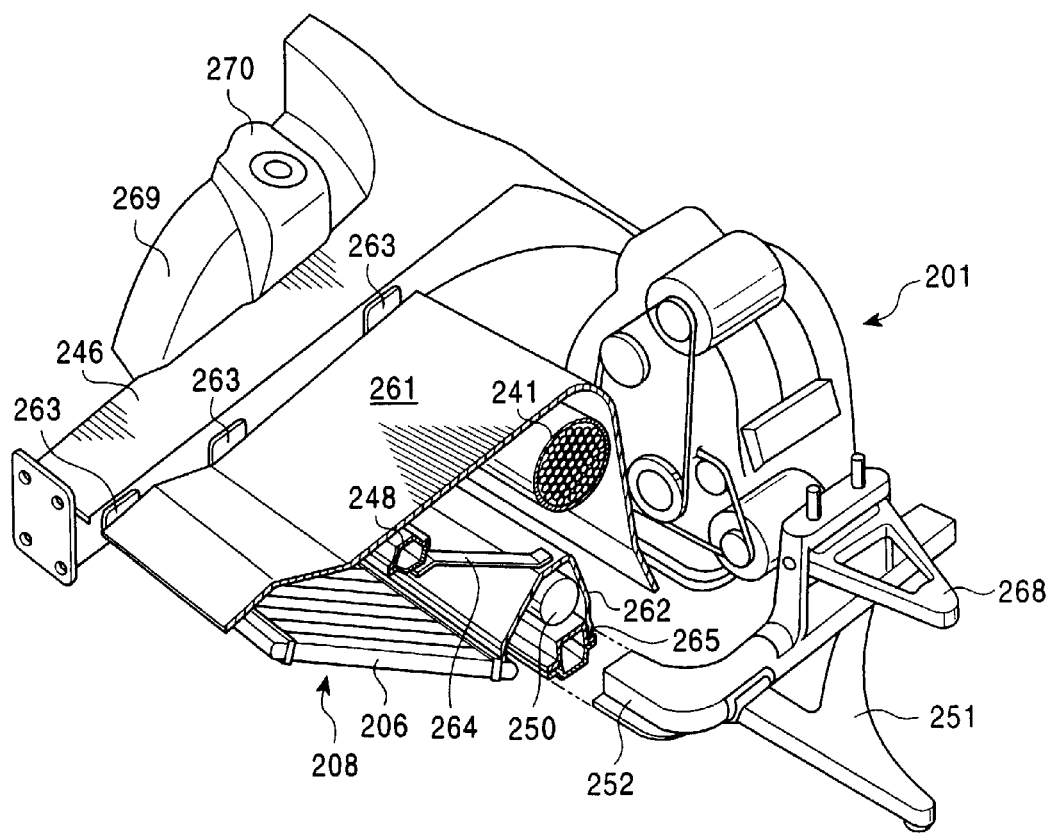
FIG. 32 is a perspective view showing an essential part of FIG. 31.

Referring to FIGS. 31 and 32, in addition to the structure shown in FIGS. 27 to 30, the structure shown therein has an upper panel 261 and lower panel 262 as shielding panels between the catalyst 241 and the engine compartment 202. These panels 261 and 262 separate the catalyst 241 and the engine compartment 202.

Referring to FIGS. 31 and 32, the upper panel 261 has a reversed L-shape in its side view. At the ends of a widthwise direction of the upper panel 261, connection pieces 263 . . . are formed as a single piece. Each of these connection pieces 263 is bolted up to the front side frame 246.

The upper panel 261 is connected to the front cross member 248 directly or by way of a spacer.

The lower panel 262 has a reversed U-shape in its side view. The upper middle part of the lower panel 262 is connected to the bottom of the bracket 264 provided to the bottom of the front cross member 248. This connection improves the rigidity. The lower back part of the lower panel 262 is connected to the suspension cross member 252 by using a bolt 265. Thus, the lower panel 262 functions as a rigid member.

In addition, the upper panel 261 and the lower panel 262 constitute a duct. The duct has a wind guide part 266 which leads air outside the engine compartment 202, namely running wind, from the opening 210 of the front grille 212 to the catalyst 241, and a wind guide part 267 which leads the wind passed through the cooling unit 208, namely the passing wind, to the catalyst 241. Thus, by cooling the catalyst 241 with the running wind and the passing wind, the accessories (see battery 209 and power steering 250) in the engine compartment 202 is prevented from the harm caused by the heat from the catalyst 241.

In this connection, in FIG. 32, 268 represents an upper arm of the front suspension, 269 represents a wheel house, and 270 represents a suspension tower.

Accordingly, in the embodiment shown in FIGS. 31 and 32, the engine positioning structure further has a shielding panel (see upper panel 261 and lower panel 262) provided between the catalyst 241 and the engine compartment 202.

According to the structure, the shielding panel (see upper panel 261 and lower panel 262) prevents an accessory in the engine compartment 202 from being adversely affected by the heat from the catalyst 241. Thus, the harm caused by the heat can be prevented.

In addition, the shielding panel (see upper panel 261 and lower panel 262) has a wind guide parts 267, 266 which lead a passing wind and/or a running wind of the cleaning unit 208 to the catalyst 241.

According to the structure, since a passing wind and/or a running wind of the cleaning unit 208 are led to the catalyst 241, the catalyst 241 can be cooled (air-cooled) more effectively.

Furthermore, the shielding panel (see upper panel 261 and lower panel 262) has a wind guide part 266 which leads air outside the engine compartment 202 to the catalyst 241.

According to the structure, the catalyst 241 can be cooled more appropriately by using the air outside the engine compartment 202.

Moreover, the shielding panel (see lower panel 262) connects to a suspension cross member 252 and operates as a rigid member.

According to this structure, since the shielding panel (see lower panel 262) is connected to a suspension cross member 252, it is possible to improve the supporting rigidity of the shielding panel (see lower panel 262). In addition, the rigidity of the automobile body can be also improved by the connecting structure.

In addition, in this embodiment, the upper panel 261 is connected to front side frame 246 and front cross member 248. As a result, similar to lower panel 262, since the upper panel 261 also functions as a rigid member, the connection improves the rigidity of front part of the automobile.

In this connection, the wind used for cooling the catalyst 241 is emitted from a duct outlet 271 to the outside the automobile under the engine compartment 202.

For this embodiment, almost the same structures, operations and advantages as those for the previous embodiment are achieved. Thus, the same reference numbers used in the previous drawings are used in FIGS. 31 and 32 for referring to the same elements, and detailed explanation is omitted.

Figure 33:
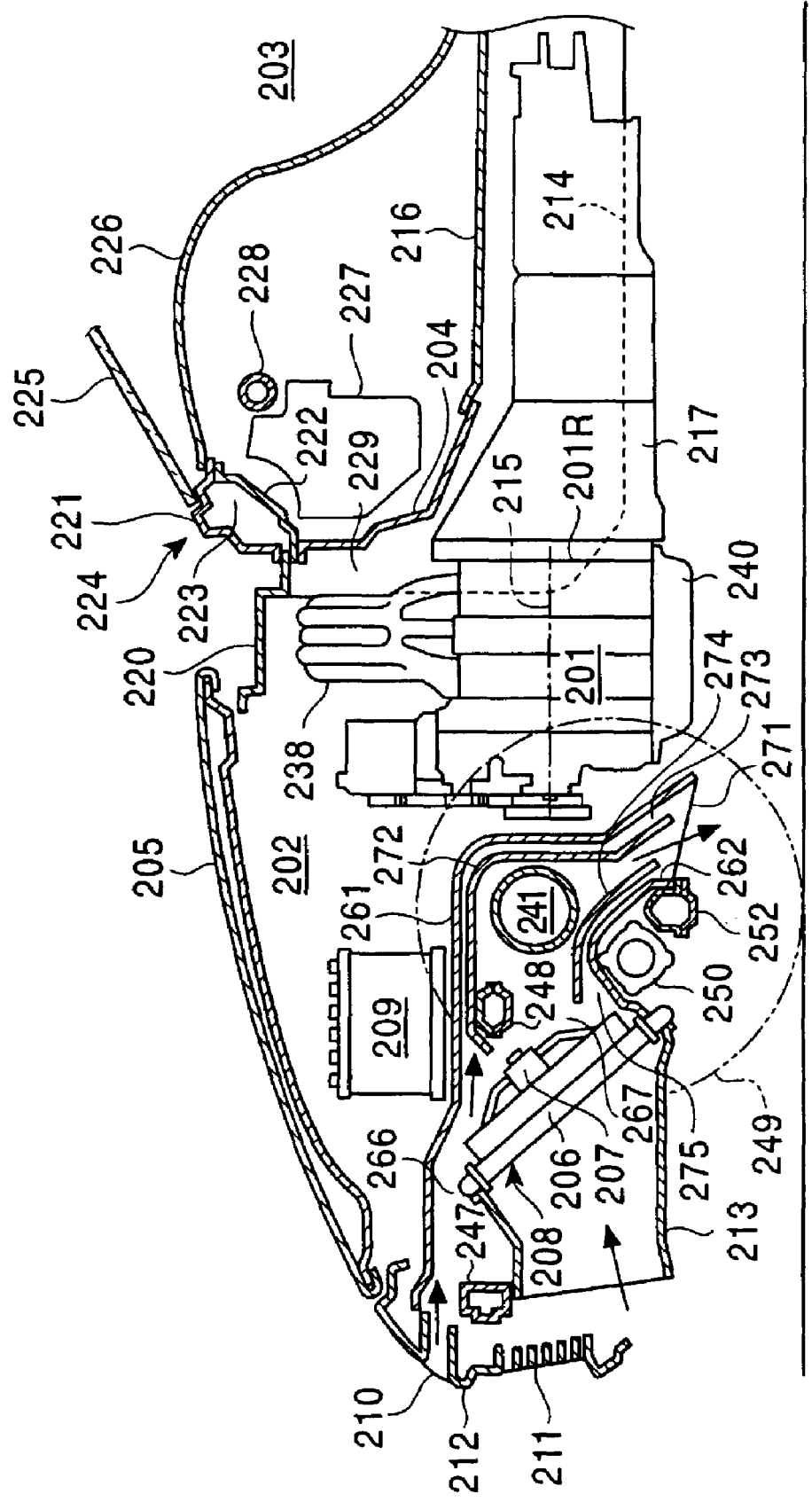
FIG. 33 is a side view showing an engine positioning structure for an automobile of another embodiment of the present invention.

Referring to FIG. 33, in addition to the structure shown in FIGS. 31 to 32, the structure shown therein has an upper inner duct 272 between the upper panel 261 and the catalyst 241. Thus, a wind guide path 273 is formed between the upper panel 261 and the upper inner duct 272. In addition, a lower inner duct 274 is provided between the lower panel 262 and the catalyst 241. Thus, a wind guide path 275 is formed between the lower panel 262 and the lower inner duct 274.

A running wind from the opening 210 of the front grille 212 and a passing wind from the cooling unit 208 circulate through the upper wind guide path 273. On the other hand, a passing wind from the cooling unit 208 circulates through the lower wind guide path 275.

In this regard, in order to improve rigidity, the upper inner duct 272 is bolted up directly to the front cross member 248.

Accordingly, in the embodiment shown in FIG. 33, the wind guide parts 266, 267 consist of a wind guide duct (see upper panel 261 and lower panel 262), and an inner ducts 272, 274 are provided between the wind guide duct and the catalyst 241.

According to this structure, since an inner wind guide path passing through the catalyst 241 and outer wind guide paths 273, 275 between the inner ducts 272, 274 and the wind guide duct (see upper panel 261 and lower panel 262) are formed simultaneously, these paths effectively prevent an accessory in the engine compartment 202 from being affected by the heat from the catalyst 241.

For this embodiment, almost the same structures, operations and advantages as those for the previous embodiment shown in FIG. 31 are achieved. Thus, the same reference numbers used in FIG. 31 are used in FIG. 33 for referring to the same elements, and detailed explanation is omitted.

Figure 34:
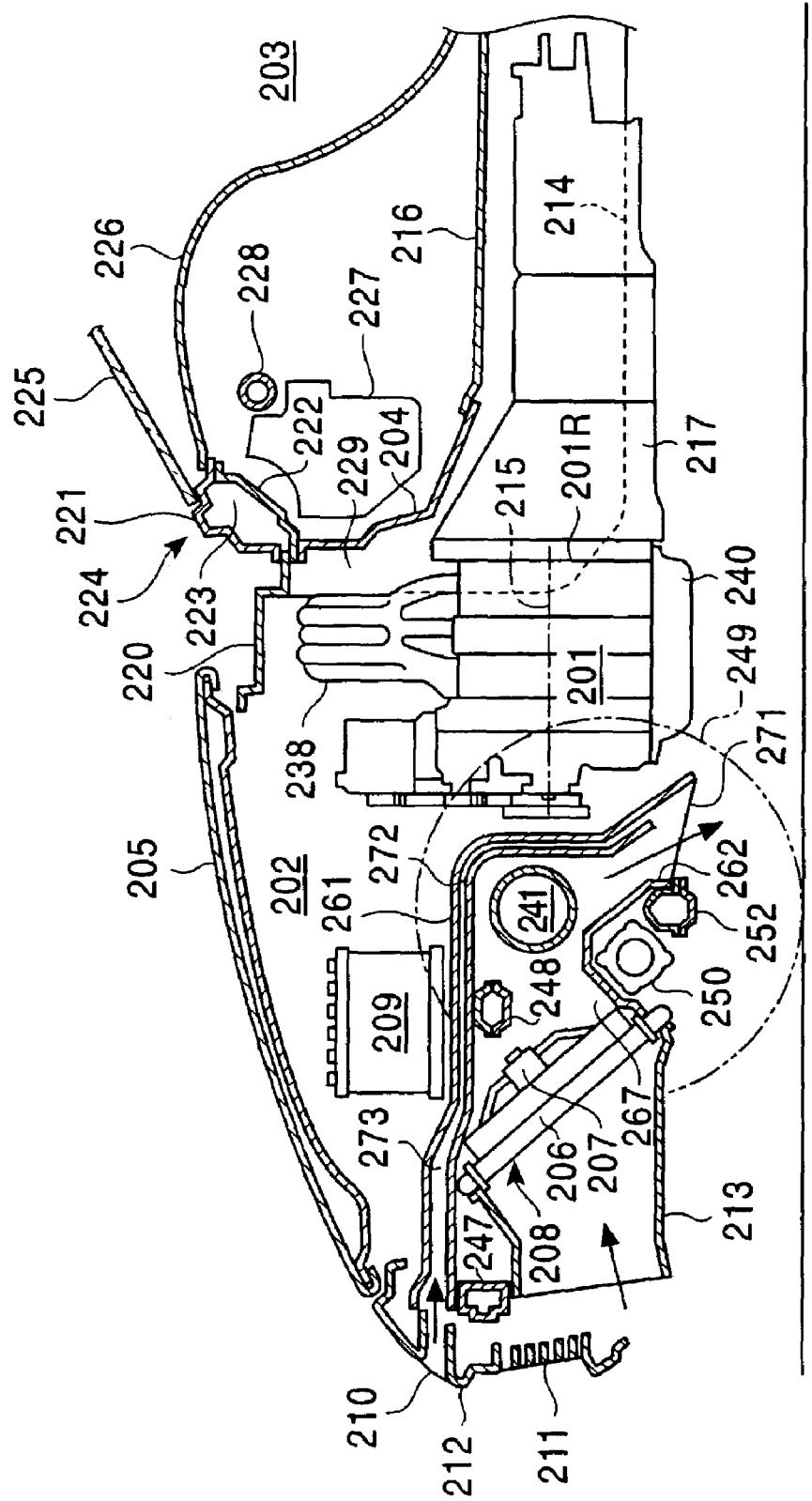
FIG. 34 is a side view showing an engine positioning structure for an automobile of another embodiment of the present invention.

Referring to FIG. 34, in addition to the structure shown in FIGS. 31 to 32, the structure shown therein has an upper inner duct 272 between the upper panel 261 and the catalyst 241. Thus, a wind guide path 273 is formed between the upper panel 261 and the upper inner duct 272. In this case, the upper inner duct 272 is extended from the position behind the opening 210 to the proximity of the duct outlet 271 so that only a running wind from the opening 210 of the front grille 212 circulates through the upper wind guide path 273.

According to this structure, since an inner wind guide path passing through the catalyst 241 and an outer wind guide paths 273 between the inner duct 272 and the upper panel 261 are formed simultaneously, these paths more effectively prevent an accessory in the engine compartment 202 from being affected by the heat from the catalyst 241. Furthermore, only a running wind circulates through the wind guide path 273. Since the running wind generally has lower temperature than the passing wind from the cooling unit, the harm caused by the heat can be prevented more effectively.

For this embodiment, almost the same structures, operations and advantages as those for the previous embodiment shown in FIG. 31 are achieved. Thus, the same reference numbers used in FIG. 31 are used in FIG. 34 for referring to the same elements, and detailed explanation is omitted.

Figure 35:
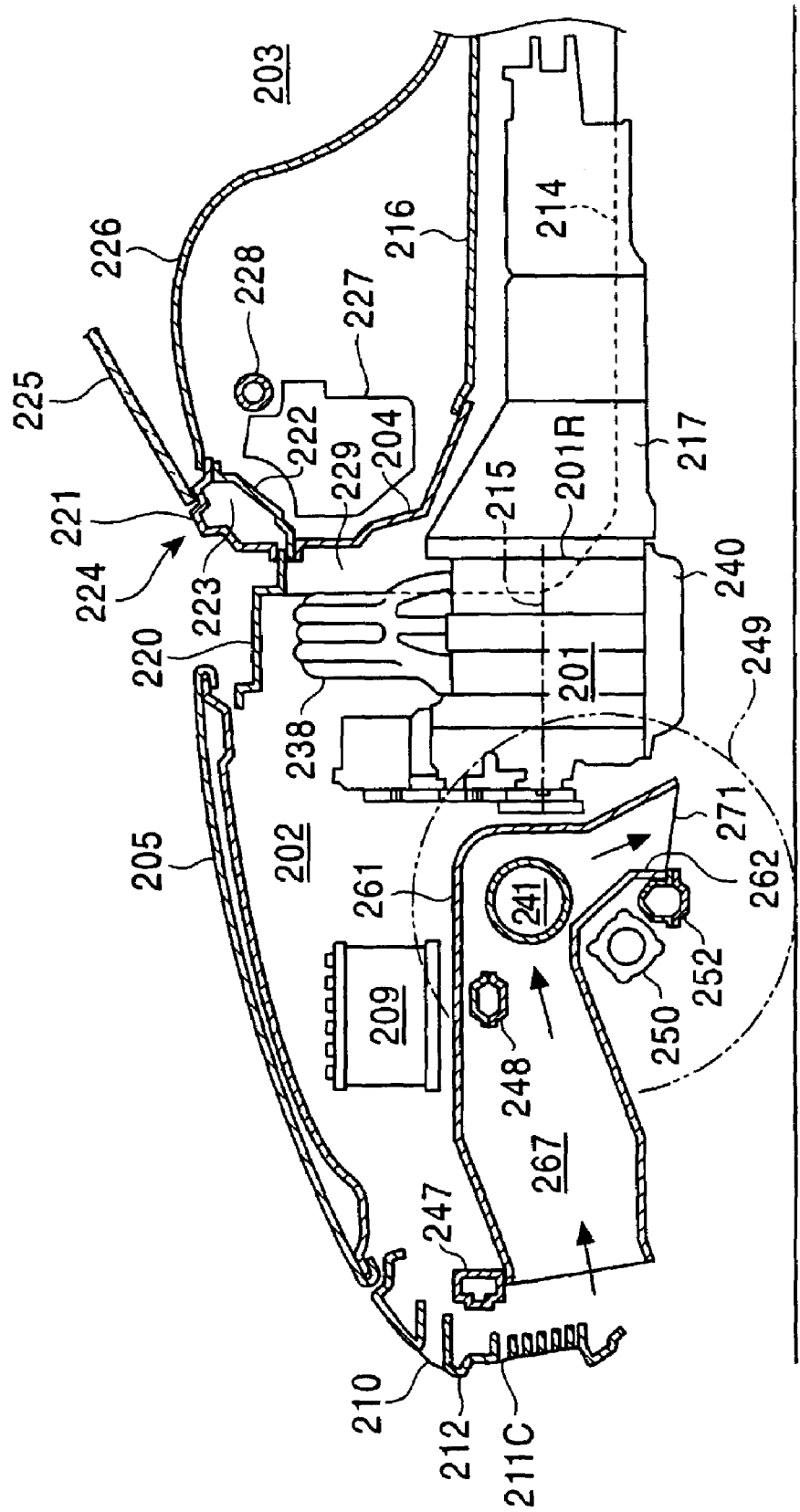
FIG. 35 is a side view showing an engine positioning structure for an automobile of another embodiment of the present invention.
Figure 36:
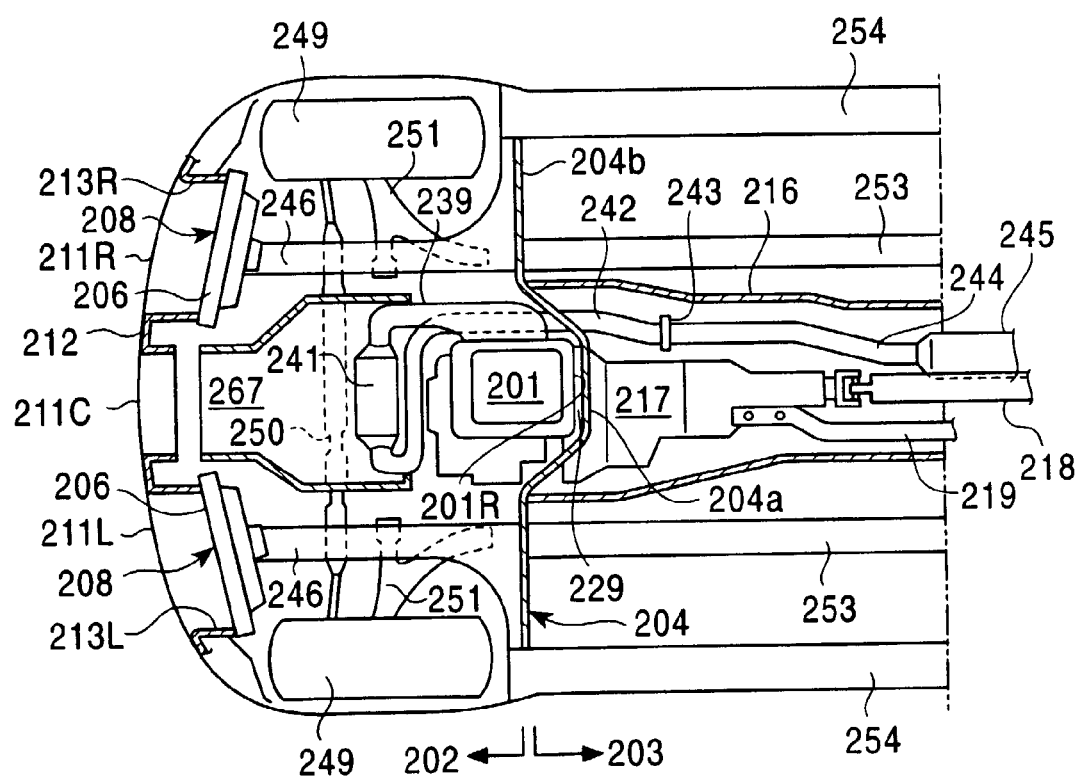
FIG. 36 is a plan view showing an essential part of FIG. 35.

Referring to FIGS. 35 and 36, upper panel 261 and lower panel 262 as shielding panels form wind guide part 267. The wind guide part 267 corresponds to the opening 211C at the center part of the widthwise direction in the front grille 212 as shown in FIG. 36. Openings 211L, 211R are offset in a widthwise direction relative to the opening 211C. At the openings 211L, 211R, ducts 213L, 213R are provided to lead running wind to the front surfaces of the radiators 206, 206 of the cooling units 208, 208. Thus, the path for leading the running wind to the radiator 206 is used exclusively for the radiator, while the wind guide part 267 for leading the running wind to the catalyst 241 is used solely for the catalyst.

Accordingly, in the embodiment shown in FIGS. 35 and 36, the wind guide duct (see upper panel 261 and lower panel 262) which leads a running wind directly to the catalyst 241 and duct 213L, 213R which lead a running wind to radiators 206, 206 are offset from each other in a widthwise direction.

According to this structure, a layout of the catalyst 241 and that of the radiators 206, 206 can be reconciled. In addition, since a running wind is led directly to both the catalyst 241 and radiator 206, it is possible to cool both of them effectively.

For this embodiment, almost the same structures, operations and advantages as those for the previous embodiment are achieved. Thus, the same reference numbers used in the previous figures are used in FIGS. 35 and 36 for referring to the same elements, and detailed explanation is omitted.

Figure 37:
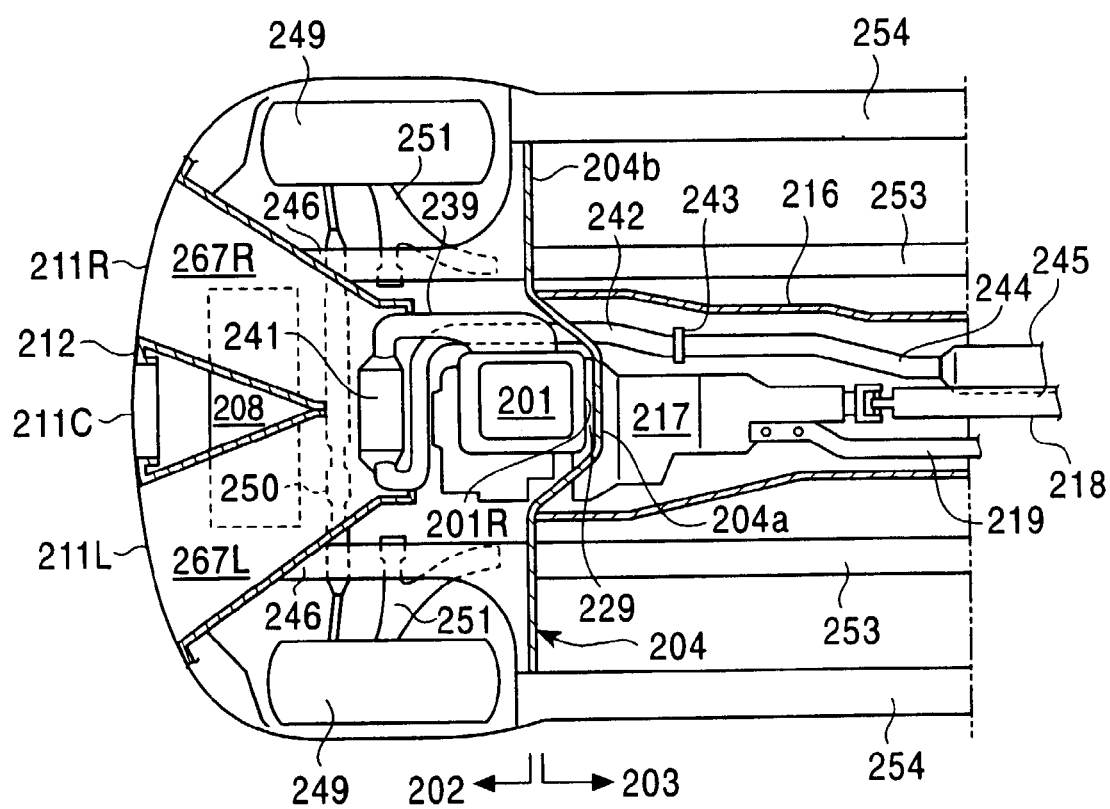
FIG. 37 is a side view showing an engine positioning structure for an automobile of another embodiment of the present invention.

Referring to FIG. 37, the wind guide part which directly leads running wind to the catalyst 241 is split into left wind guide part 267L and right wind guide part 267R. The rear ends of these wind guide parts 267L, 267R are merged at the position of the catalyst 241. Openings 211L, 211R are offset in a widthwise direction relative to the opening 211C at the center part of the front grille 212. Each of the front ends of the wind guide parts 267L, 267R communicates with the openings 211L, 211R, respectively. Thus, the running wind from each of the openings 211L, 211R is lead to the catalyst 241 by way of left and right wind guide parts 267L, 267R to cool the catalyst 241 by the running wind. Behind the opening 211C at the center of the front grille 212, a cooling unit 208 is disposed on the tilt such that its front part is higher than its rear part.

According to this structure, it becomes possible to take a large amount of running wind from the openings 211L, 211R corresponding to the total area of the left and right openings 211L, 211R, and to cool the catalyst 241 effectively by the running wind. In addition, a single cooling unit 208 is disposed at the center in the widthwise direction corresponding to the opening 211C. As a result, handling of the radiator hose and radiator outlet hose becomes easier, and the number of the parts to be used is reduced.

For this embodiment, almost the same structures, operations and advantages as those for the previous embodiment are achieved. Thus, the same reference numbers used in the previous figures are used in FIG. 37 for referring to the same elements, and detailed explanation is omitted.

Figure 38:
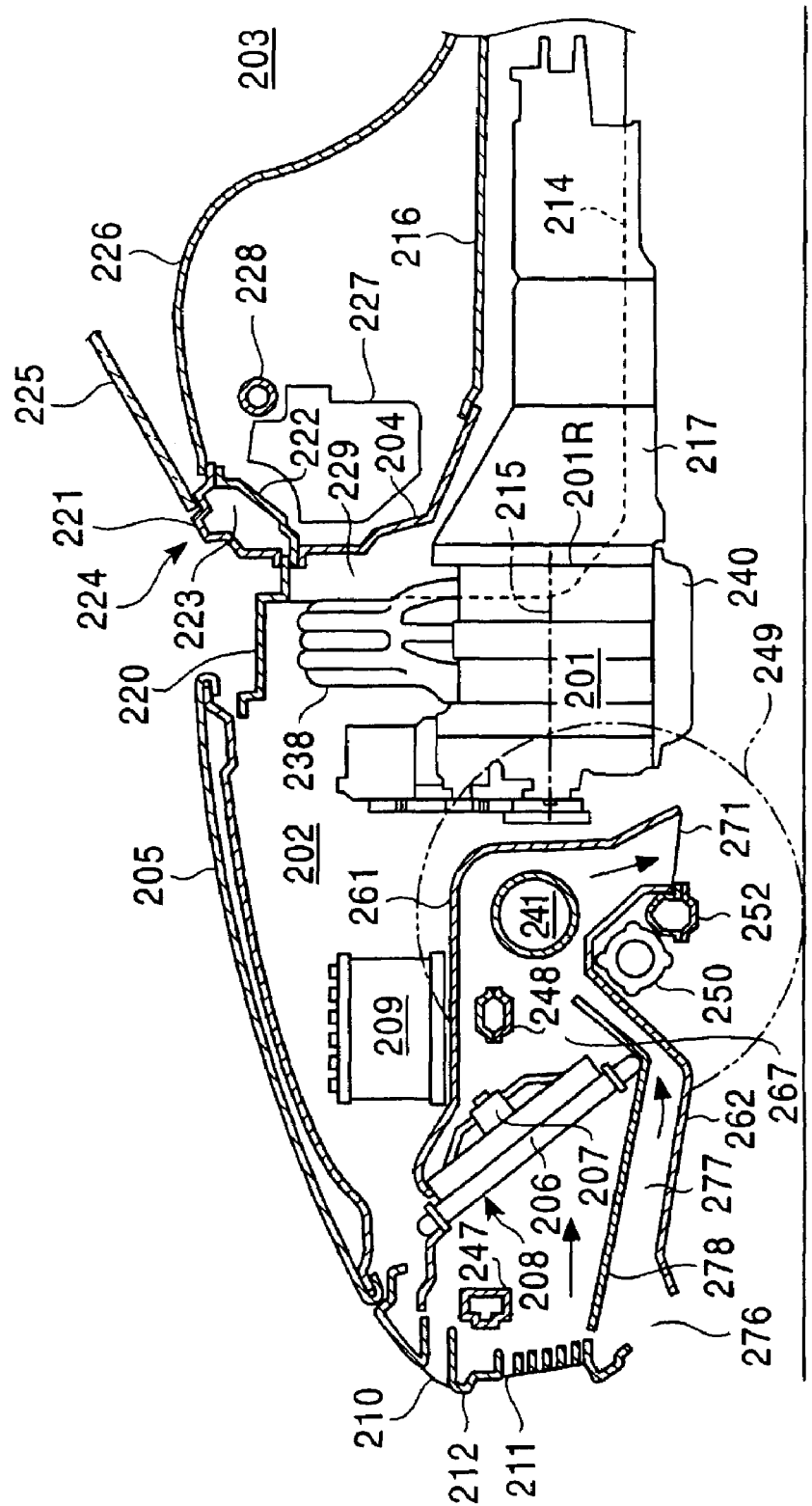
FIG. 38 is a side view showing an engine positioning structure for an automobile of another embodiment of the present invention.
Figure 39:
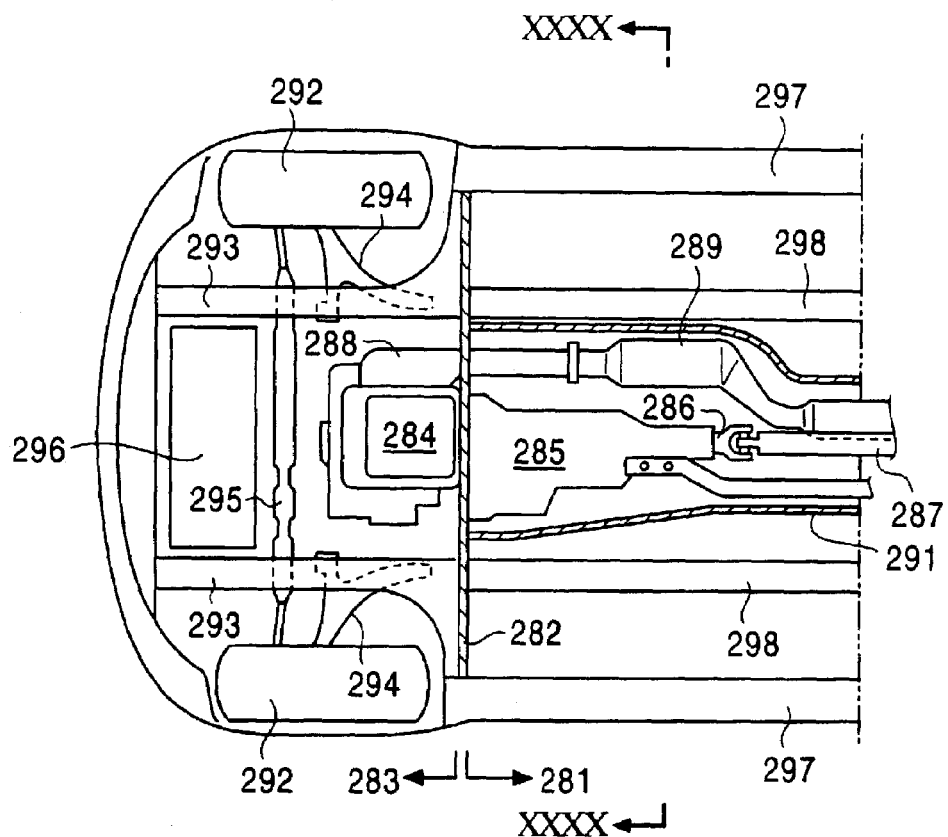
FIG. 39 is a plan view showing an engine positioning structure for an automobile of the prior art.
Figure 40:
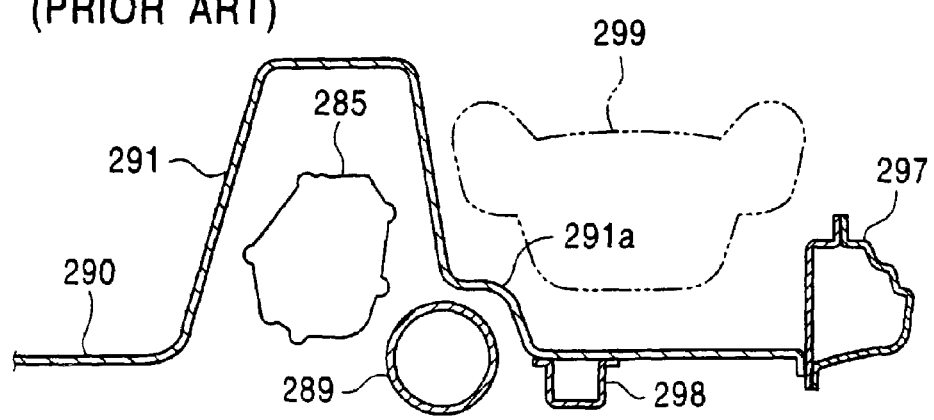
FIG. 40 is a cross-sectional view of XXXX—XXXX arrows line in FIG. 39.

Referring to FIG. 38, upper panel 261 and lower panel 262 as shielding panels are disposed between the catalyst 241 and the engine compartment 202 to form a wind guide duct. The front part of the wind guide duct faces to upper and lower openings 210, 211 at the front grille 212 and to a running wind intake part 276 under the front grille 212. In addition, the rear parts of both of the panels 261, 262 are positioned between the suspension cross member 252 and an oil pan 240 of the engine 201 to form a duct outlet 271.

In addition, a partition plate 278 is provided such that it extends from the bottom of the opening 211 of the front grille 212 through under the lower tank of the radiator 206 to beneath the front cross member 248. At the upstream of the catalyst 241, the partition plate 278 divides the interior of the wind guide duct into a wind guide part 267 through which the passing wind through the cleaning unit passes and a wind guide path which leads a running wind directly to the catalyst 241 to cool it.

Furthermore, the cooling unit 208 is disposed between the upper panel 261 and the partition plate 278 on the tilt such that its front part is higher than its rear part. On the other hand, the downstream of the wind guide path 277 is disposed toward the catalyst 241 on the slant such that its front part is higher than its rear part.

Thus, in this embodiment, the catalyst 241 is cooled by both the wind passing through the cooling unit and the running wind through the wind guide path 277.

Accordingly, in the embodiment shown in FIG. 38, the structure has a wind guide duct (see wind guide path 277 formed by partition plate 278 and lower panel 262) which leads a running wind directly to the catalyst 241 to cool it.

According to this structure, since a running wind is led directly to the catalyst 241, it is possible to cool it effectively.

For this embodiment, almost the same structures, operations and advantages as those for the previous embodiment are achieved. Thus, the same reference numbers used in the previous figures are used in FIG. 38 for referring to the same elements, and detailed explanation is omitted.

Comparing the elements of the present invention with those in the embodiments described herein, the engine corresponds to rotary engine 201; the dash panel corresponds to dash lower panel 204; the rotation axis of the engine corresponds to eccentric shaft 235; the shielding panel corresponds to upper panel 261 and lower panel 262; the wind guide duct leading a running wind directly to the catalyst corresponds the duct which constitutes wind guide parts 267, 267L, 267R shown in FIGS. 9, 10 and 11 and to the duct which constitutes the wind guide path 277; and the inner duct corresponds to upper inner duct 272 and lower inner duct 274. However, the scope of the present invention is not limited to the above-described embodiments.

According to this structure, since in an engine positioning structure for a rear wheel drive automobile, since the engine is positioned so that a rotation axis of the engine is at a position higher than the height of the floor panel of the passenger compartment, and the exhaust pipe is mounted such that it extends in front of the engine and then to the rear of the engine, it becomes possible to obtain retreated layout of the engine. In addition, since the Yaw moment of inertia is reduced, the steering stability can be improved. Furthermore, since the protruding part at the tunnel part which was inevitable in the prior art is eliminated, it is possible to retain enough space in the passenger compartment.

What is claimed is:

1. An engine positioning structure for a rear wheel drive automobile, the automobile having a longitudinal axis and having a passenger compartment with a floor panel and an engine compartment in front of the passenger compartment, the two compartments being separated by a dash panel, with an engine mounted in the engine compartment driving the rear wheels, the engine positioning structure comprising:
    means for positioning the engine so that a rotation axis of the engine is at a position higher than the height of the floor panel of the passenger compartment;
    means for positioning a rear end part of the engine behind a general plane of the dash panel;
    a cowl which is provided at the upper part of the dash panel, the cowl having a closed cross-section structure extending in a widthwise direction relative to the longitudinal axis;
    a part of the cowl having a reduced closed cross-section at the center part of the widthwise direction where the size of the closed cross-section is rearwardly reduced in the longitudinal direction; and
    the rear end of the engine being mounted within the part of the cowl having a reduced closed cross-section.

2. The engine positioning structure for an automobile of claim 1, wherein the cowl has a reinforcement panel connected to the part of the cowl having a closed cross-section such that the reinforcement panel covers the part of the cowl having a reduced closed cross-section.

3. The engine positioning structure for an automobile of claim 2, wherein the reinforcement panel is removably mounted to the cowl.

4. The engine positioning structure for an automobile of claim 1, wherein the engine positioning structure further comprises:
    an instrument panel member extending in a widthwise direction;
    an instrument panel supported by the instrument panel member; and
    an air conditioning unit,
    the instrument panel member and the air conditioning unit are located in the rear of the cowl, and the instrument panel member is located so that the instrument panel member overlaps with the position of the air conditioning unit.

5. The engine positioning structure for an automobile of claim 1, wherein the engine positioning structure further comprises:
    an instrument panel member extending in a widthwise direction;
    an instrument panel supported by the instrument panel member; and
    an air conditioning unit,
    the instrument panel member and the air conditioning unit are located in the rear of the cowl, and the instrument panel member being located rearwardly of the position corresponding to the part of the cowl that has a reduced closed cross-section and in conformance with the part of the cowl that has a reduced closed cross-section.

6. The engine positioning structure for an automobile of claim 1, wherein the dash panel being mounted under the cowl, and the dash panel is recessed in conformance with the part of the cowl having a reduced closed cross-section.

* * * * *